(12) United States Patent
Zhang et al.

(10) Patent No.: US 6,231,243 B1
(45) Date of Patent: May 15, 2001

(54) PREFORM AND PROCESS FOR THE PRODUCTION THEREOF

(75) Inventors: Lihong Zhang, Tokyo; Masahiro Yoshida, Hidaka; You Ohgami, Sagamihara; Teruo Yamashita, Tokyo; Yoshiatsu Yokoo, Hidaka, all of (JP)

(73) Assignee: Hoya Corporation (JP)

( * ) Notice: Subject to any disclaimer, the term of this patent is extended or adjusted under 35 U.S.C. 154(b) by 0 days.

(21) Appl. No.: 09/138,697

(22) Filed: Aug. 24, 1998

(30) Foreign Application Priority Data

Aug. 29, 1997 (JP) .................................................. 9-233508
Aug. 29, 1997 (JP) .................................................. 9-233509
Jul. 31, 1998 (JP) ................................................ 10-217118
Jul. 31, 1998 (JP) ................................................ 10-217133

(51) Int. Cl.$^7$ .................................................. G02B 6/36
(52) U.S. Cl. ................................ 385/65; 385/83; 385/137
(58) Field of Search ............................... 385/60, 65, 78, 385/83, 136, 137

(56) References Cited

U.S. PATENT DOCUMENTS

| 4,481,023 | 11/1984 | Marechal et al. | ...................... 65/64 |
| 4,734,118 | 3/1988 | Marechal et al. | ...................... 65/102 |
| 4,854,958 | 8/1989 | Marechal et al. | ...................... 65/64 |
| 5,446,815 | * 8/1995 | Ota et al. | ................... 385/83 X |
| 5,608,827 | * 3/1997 | Boscher et al. | ................... 385/65 X |
| 5,710,850 | * 1/1998 | Watanabe et al. | ................... 385/83 X |
| 5,835,659 | * 11/1998 | Ota et al. | .................... 385/137 |
| 6,032,490 | * 3/2000 | Shibata et al. | .................... 65/169 |

* cited by examiner

Primary Examiner—John D. Lee
(74) Attorney, Agent, or Firm—Nixon & Vanderhye P.C.

(57) ABSTRACT

A preform used for producing an optical fiber fixing member having an optical fiber fixing part and a lower-staged part by a mold shaping method, is formed so as to be composed of a large-thickness portion having an upper surface or a peak portion to which that transfer-shaping surface of transfer-shaping surfaces of a shaping mold which is to shape the said optical fiber fitting portion(s) comes into contact at an initial stage of mold shaping, and a small-thickness portion having an upper surface or a peak portion to which that transfer-shaping surface of transfer-shaping surfaces of the shaping mold which is to shape the upper surface of the lower-staged part comes into contact at an initial stage of the mold shaping, the preform being formed in a configuration in which the said small-thickness portion is adjacent to the large-thickness portion, the form of the preform viewed as a plan view parallels with the form of the said optical fiber fixing member viewed as a plan view and the form of the preform viewed as a side view parallels with the form of the said optical fiber fixing member viewed as a side view, whereby the above optical fiber fixing member can be easily produced by a mold shaping method.

23 Claims, 10 Drawing Sheets

PREFORM AND PROCESS FOR THE PRODUCTION THEREOF

TECHNICAL FIELD

The present invention relates to a preform which is mold-shapable (press-shapable) to give an optical fiber fixing member for use in the fields of optics, communication, electric and electronics or semiconductors, a process for the production thereof, and a process for the production of the above optical fiber fixing member. More particularly, it relates to a preform which is mold-shapable to give an optical fiber fixing member having an optical fiber fixing part whose upper surface is provided with optical fiber fitting portion(s) for fixing end portion(s) of optical fiber(s) and a lower-staged part whose upper surface is formed at a level lower than the above optical fiber fitting portion(s), a process for the production thereof, and a process for the production of the above optical fiber fixing member.

TECHNICAL BACKGROUND

For optically interconnecting a plurality of optical fibers to a plurality of optical fibers, or for optically interconnecting a plurality of optical fibers to one or a plurality of optical parts, desirably, each of optical fibers to be connected are highly accurately fixed in advance. For example, in an optical fiber tape formed by arranging a predetermined number of single-mode optical fibers side by side, each optical fiber has a core diameter of about 10 $\mu$m, and these optical fibers are arranged at a pitch of approximately 126 to 250 $\mu$m. It is therefore desired for optical interconnection to arrange end portions of these optical fibers in a locational accuracy of within ±0.5 $\mu$m.

For the optical interconnection of a plurality of optical fibers, there is therefore used in many cases a member which fixes end portions of these optical fibers highly accurately (the above member will be referred to as "optical fiber fixing member" hereinafter), such as an optical fiber guide block. The optical fiber guide block is a thin-sheet block having an upper surface (one surface) on which a predetermined number of optical fiber fitting portion(s) for fixing end portion(s) of optical fiber(s) is/are formed. The locational accuracy of optical fibers fixed in the optical fiber guide block is dependent upon the work accuracy of the optical fiber fitting portion(s) formed on the optical fiber guide block.

The above optical fiber guide block is largely classified into an optical fiber guide block having the above optical fiber fitting portion(s) alone and an optical fiber guide block having (i) an optical fiber fixing part having an upper surface on which optical fiber fitting portion(s) is/are formed and (ii) a lower-staged part whose upper surface is formed in a position lower than the above optical fiber fitting portion(s). The lower-staged part of the latter type is used as a base for fixing optical fibers protected with coating portions together with the coating portions.

In an optical fiber guide block of any type, optical fiber fitting portion(s) is/are conventionally formed by (i) an etching method when a silicon substrate is used as a raw material or by (ii) a grinding method when glass such as quartz glass or Pyrex glass is used as a raw material. In recent years, however, it has been actively attempted to produce an optical fiber guide block by a mold shaping method (press-molding method). The mold shaping method is promising as a method which can provide an optical fiber guide block having high accuracy in optical fiber fitting portion(s) and high accuracy in appearance and having stability in these properties of accuracy, with high producibility at a low cost.

For producing a desired mold-shaped article by a mold shaping method, parameters such as the substructure of a shaping mold and shaping conditions are naturally essential, and the geometric form and dimensions of a shapable material (preform) also affect the work accuracy and the appearance form accuracy of a mold-shaped article. It is therefore essential to determine a proper form and dimensions of the preform for improving the yield of non-defective products produced by the mold shaping.

For example, in the mold shaping method described in JP-B-61-32263, a preform is formed so as to have a form similar to the form of a lens as an end product, and a glass lens is fabricated by properly selecting $t_0$, P and $\mu$ depending upon $C = t_0 P/\mu$ in which C is a value dependent upon a difference between the form of a shaping mold (cavity form) and the form of a preform (C decreases with a decrease in the above difference), $t_0$ is a time period necessary for bringing the form of a preform into conformity with the form of a shaping mold (cavity form) during press-shaping (mold shaping), P is a hydrostatic pressure inside glass (preform) when the glass is sufficiently pressed during press-shaping and $\mu$ is a viscosity of the glass during the press-shaping (mold shaping).

Since, however, an optical fiber guide block is a thin-sheet-like block (its maximum thickness is, for example, approximately 1.0 to 1.5 mm), the flow of a shapable material does not easily occur during mold shaping. When the optical fiber guide block as an end product is a type having an optical fiber fixing part and a lower-staged part, it is required to form a level difference between the optical fiber fixing part and the lower-staged part. The formation of the above level difference makes it very difficult to cause the flow of a shapable material from a small-thickness portion to a large-thickness portion through the above level-difference portion, or in a direction counter thereto, during mold shaping. Further, when the mold shaping is carried out to obtain an optical fiber guide block, it is required to attain the two purposes, pattern transfer (formation of optical fiber fitting portion(s)) and formation of an appearance, by one cycle of mold shaping.

It is therefore more difficult to produce optical fiber guide blocks of the type having an optical fiber fixing part and a lower-staged part at high yields of non-defective products by mold shaping than to produce lenses at a high yields of non-defective products by mold shaping.

If the viscosity of a shapable material during mold shaping is decreased to less than $10^{7.6}$ poise, it is possible to cause the sufficient flow of the shapable material even when an optical fiber guide block having an optical fiber fixing part and a lower-staged part is produced. However, when the viscosity of a shapable material is so decreased, the following problems occurs. That is, the problems are that (i) the accuracy of transfer of a pattern for optical fiber fitting portion(s) decreases, and that (ii) the flow of a shapable material is liable to become non-uniform so that the shapable material is liable to flow out through gaps (clearances) of a shaping mold to cause burrs on corners and edges of a mold-shaped article (optical fiber guide block).

An optical fiber guide block of a type having an optical fiber fixing part and a lower-staged part can be also obtained by a method in which the optical fiber fixing part alone is formed during mold shaping and then the lower-staged part is formed by grinding work. However, this method requires an additional step, which results in an increase in a production cost and a decrease in producibility.

DISCLOSURE OF THE INVENTION

It is an object of the present invention to provide a preform which is shapable to an optical fiber fixing member having a desired appearance with high producibility and at high yields of non-defective products by a mold shaping method, a process for the production thereof, and a process for the production of an optical fiber fixing member, which process enables the production of an optical fiber fixing member having a desired appearance with high producibility and at high yields of non-defective products.

According to the present invention, the above object is achieved by a preform shapable, by a mold shaping method, into an optical fiber fixing member having an optical fiber fixing part having an upper surface on which optical fiber fitting portion(s) for fixing end portion(s) of optical fiber(s) is/are formed and a lower-staged part of which the upper surface is formed in a position lower than the said optical fiber fitting portion(s) and which is formed adjacent to the optical fiber fixing part, the preform comprising a large-thickness portion having an upper surface or a peak portion to which that transfer-shaping surface of transfer-shaping surfaces of a shaping mold for mold shaping which is to shape the said optical fiber fitting portion(s) comes into contact at an initial stage of mold shaping, and a small-thickness portion having an upper surface or a peak portion to which that transfer-shaping surface of transfer-shaping surfaces of the shaping mold which is to shape the upper surface of the lower-staged part comes into contact at an initial stage of the mold shaping, the preform being formed in a configuration in which the said small-thickness portion is adjacent to the large-thickness portion, the form of the preform viewed as a plan view parallels with the form of the said optical fiber fixing member viewed as a plan view and the form of the preform viewed as a side view parallels with the form of the said optical fiber fixing member viewed as a side view.

According to the present invention, further, the above object of the present invention is achieved by a process for the production of a preform shapable, by a mold shaping method, into an optical fiber fixing member having an optical fiber fixing part having an upper surface on which optical fiber fitting portion(s) for fixing end portion(s) of optical fiber(s) is/are formed and a lower-staged part of which the upper surface is formed in a position lower than the said optical fiber fitting portion(s) and which is formed adjacent to the optical fiber fixing part, the process comprising preparing a material for the said preform, the material having a thickness equivalent to, or greater than, a maximum thickness of the said preform, partly grinding the said material to form a small-thickness portion and then preparing the said material into a material having a size which, as a plan view, is equivalent to, or greater than, the size of the preform as a plan view, or preparing the said material into a material having a size which, viewed as a plan view, is equivalent to, or greater than, the size of the preform as a plan view and then partly grinding the said material to form a small-thickness portion, and preparing said material into a shaped material having (i) a large-thickness portion and (ii) a small-thickness portion having an upper surface or a peak portion formed in a position lower than an upper surface or a peak portion of the said large-thickness portion, wherein the said small-thickness portion is formed adjacent to the said large-thickness portion, the form of the shaped material viewed as a plan view parallels with the form of the said optical fiber fixing member viewed as a plan view and the form of the shaped material viewed as a side view parallels with the form of the said optical fiber fixing member viewed as a side view (the above process will be referred to as "Process I" hereinafter).

Further, according to the present invention, the above object of the present invention is achieved by a process for the production of a preform shapable, by a mold shaping method, into an optical fiber fixing member having an optical fiber fixing part having an upper surface on which optical fiber fitting portion(s) for fixing end portion(s) of optical fiber(s) is/are formed and a lower-staged part of which the upper surface is formed in a position lower than the said optical fiber fitting portion(s) and which is formed adjacent to the optical fiber fixing part, the process comprising casting a material for the said preform into a die in a state where the material is imparted with a flowability, solidifying the material and releasing the solidified material from the die, and thereby obtaining a shaped material comprising a large-thickness portion having an upper surface or a peak portion to which that transfer-shaping surface of transfer-shaping surfaces of a shaping mold for mold shaping which is to shape the said optical fiber fitting portion(s) comes into contact at an initial stage of mold shaping, and a small-thickness portion having an upper surface or a peak portion to which that transfer-shaping surface of transfer-shaping surfaces of the shaping mold which is to shape the upper surface of the lower-staged part comes into contact at an initial stage of the mold shaping, the shaped material being formed in a configuration in which the said small-thickness portion is adjacent to the large-thickness portion, the form of the shaped material viewed as a plan view parallels with the form of the said optical fiber fixing member viewed as a plan view and the form of the shaped material viewed as a side view parallels with the form of the said optical fiber fixing member viewed as a side view (the above process will be referred to as "Process II" hereinafter).

Further, according to the present invention, the above object of the present invention is achieved by a process for the production of an optical fiber fixing member by mold shaping, the optical fiber fixing member having an optical fiber fixing part having an upper surface on which optical fiber fitting portion(s) for fixing end portion(s) of optical fiber(s) is/are formed and a lower-staged part of which the upper surface is formed in a position lower than the said optical fiber fitting portion(s) and which is formed adjacent to the optical fiber fixing part, the process comprising mold-shaping the above preform into the optical fiber fixing member with a shaping mold having a predetermined form by pressing the preform in a direction substantially in parallel with the thickness direction of the preform (the above process will be referred to as "Process III" hereinafter).

BEST MODES FOR PRACTICING THE INVENTION

Figure 1:
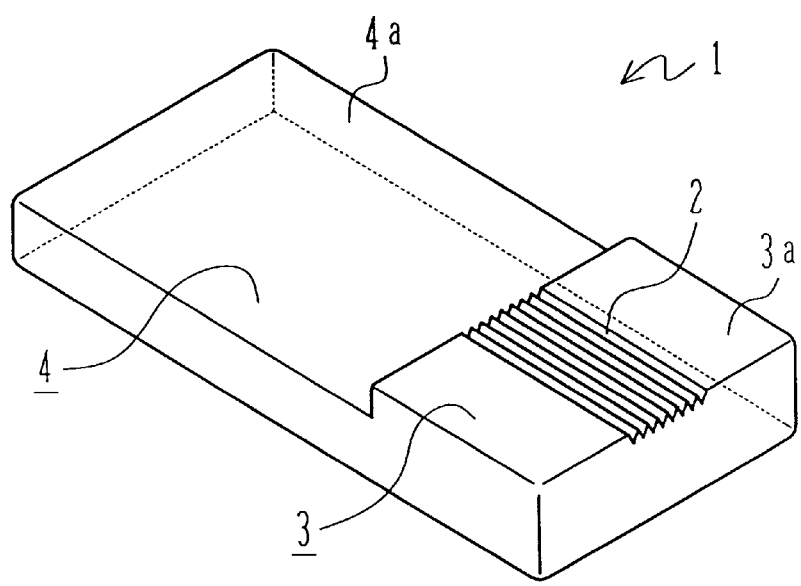
FIG. 1 is a schematic perspective view of an optical fiber guide block to be obtained in Examples.

Embodiments of the present invention will be explained in detail hereinafter.

First, the preform of the present invention will be explained.

The preform of the present invention is a preform which is mold-shapable into an optical fiber fixing member having an optical fiber fixing part having an upper surface on which optical fiber fitting portion(s) for fixing end portion(s) of optical fiber(s) is/are formed and a lower-staged part of which the upper surface is formed in a position lower than the said optical fiber fitting portion(s) and which is formed adjacent to the optical fiber fixing part.

The above preform is formed of a large-thickness portion having an upper surface or a peak portion to which that transfer-shaping surface of transfer-shaping surfaces of a shaping mold for mold shaping which is to shape the said optical fiber fitting portion(s) comes into contact at an initial stage of mold shaping, and a small-thickness portion having an upper surface or a peak portion to which that transfer-shaping surface of transfer-shaping surfaces of the shaping mold which is to shape the upper surface of the lower-staged part comes into contact at an initial stage of the mold shaping. The above "upper surface or peak portion" of the large-thickness portion refers to an upper surface or a peak portion of the large-thickness portion when the preform is viewed right from above such that the upper surface or the peak portion of the small-thickness portion to be mentioned later can also comes into view.

The small-thickness portion is formed adjacent to the large-thickness portion. The upper surface or the peak portion of the small-thickness portion may have a form in which the upper surface or the peak portion thereof sharply sinks from the large-thickness portion or the large-thickness portion gradually decreases in thickness until its side face (which may be a flat surface or a curved surface) finally reaches the upper surface or the peak portion of the small-thickness portion. In any case, the preform of the present invention is formed such that the form of the preform viewed as a plan view parallels with the form of an intended optical fiber fixing member viewed as a plan view and that the form thereof viewed as a side view parallels with the form of the intended optical fiber fixing member viewed as a side view.

The above "form of a preform viewed as a side view" in the present invention refers to the form of the preform viewed as follow. Viewing the preform right from above such that the upper surface or the peak portion of the lower-staged part also comes into view refers to viewing it as a plan view (used in this sense hereinafter), viewing the preform from the large-thickness portion side such that the large-thickness portion and the small-thickness portion are in series refers to viewing it as a front view (used in this sense hereinafter), and in these cases, viewing the preform from its side refers to viewing the preform as a side view. Further, viewing the preform in a direction 180° opposite to the direction in which the preform is viewed as a front view will refer to viewing it as a backside view, and viewing the preform in a direction 180° opposite to the direction in which the preform is viewed as a plan view will refer to viewing the preform as a bottom view.

The "form of an optical fiber fixing member as a side view" in the present invention refers to the form of the optical fiber fixing member viewed as follows. Viewing the optical fiber fixing member right from above such that the optical fiber fitting portion(s) also come into view refers to viewing it as a plan view (used in this sense hereinafter), viewing the optical fiber fixing member in the longitudinal direction of the optical fiber fitting portion(s) from the optical fiber fixing part side refers to viewing it as a front view (used in this sense hereinafter), and in these cases, viewing the optical fiber fixing member from its side refers to viewing it as a side view.

In principle, the preform of the present invention may be any preform so long as it satisfies the above conditions, and each surface of the preform may be a flat surface or it may be a curved surface. However, an extremely concave surface is not desirable.

The optical fiber fixing part of the intended optical fiber fixing member is formed by mold-shaping the large-thickness portion of the preform of the present invention (naturally, a shapable material flows into and from the small-thickness portion and the large-thickness portion during mold shaping). The upper surface or the peak portion of the large-thickness portion naturally comes into contact, at an initial stage of mold shaping (including a point of time when the preform is placed in a shaping mold), with that transfer-shaping surface (to be referred to as "transfer-shaping surface for shaping optical fiber fitting portion(s)" hereinafter) of transfer-shaping surfaces of a shaping mold, which is to shape the above optical fiber fitting portion(s).

In the formation of optical fiber fitting portion(s) having a predetermined form(s) such as V groove(s) in the optical fiber fixing part by transferring a pattern having a predetermined form during mold shaping, preferably, the maximum thickness t of the large-thickness portion of the preform is determined so as to satisfy that the ratio of t/T, in which t is as defined above and T is the maximum thickness of the optical fiber fixing part of an intended optical fiber fixing member, should be between 1.001 and 2.5 for sufficiently transferring the pattern during the mold shaping.

When the above ratio t/T is less than 1.001, the deformation of the large-thickness portion is small during mold shaping, the transferability of a pattern for optical fiber fitting portion(s) therefore decreases and it is difficult to form optical fiber fitting portion(s) as desired. When the above ratio t/T exceeds 2.5, the deformation of the large-thickness portion during mold shaping is greater than the deformation that is necessary for highly accurately transferring a pattern for optical fiber fitting portion(s), that is, it is required to deform the preform more than necessary for obtaining an optical fiber fixing member as desired. The preform can be easily deformed to a large extent by decreasing the viscosity of the preform (shapable material) during mold shaping. However, when the above viscosity is decreased extremely, the transferability of a pattern for optical fiber fitting portion(s) is liable to decrease, burrs are liable to occur locally, and it is therefore difficult to obtain an optical fiber fixing member as desired. In the present specification, the "deformation" refers to a thickness difference between a preform and a mold-shaped article.

The above ratio t/T is more preferably between 1.005 and 2.2, particularly preferably between 1.01 and 2.0.

The volume of the preform of the present invention is substantially constant depending upon the volume of an optical fiber fixing member to be produced regardless of the form of the preform. For obtaining the preform which is easily shapable into an optical fiber fixing member having a desired appearance with high producibility at high yields of non-defective products, however, it is preferred to allow the large-thickness portion and the small-thickness portion to share the volume of the preform as follows.

That is, the volume of the preform is preferably divided such that the volume ratio $[(v_1/V_1)-(v_2/V_2)]$ is between 0.001 and 0.1, in which $V_1$ is a volume of the optical fiber fixing part of an optical fiber fixing member to be produced by a mold shaping method, $V_2$ is a volume of the lower-staged part of the optical fiber fixing member, $v_1$ is a volume of the large-thickness portion of a preform and $v_2$ is a volume of the small-thickness portion of the preform.

In the present specification, the above $V_1$ refers to a volume defined by planes when it is assumed that the planes surround the optical fiber fixing part of an optical fiber fixing member, which is to be produced by a mold shaping method, by circumscribing all the surfaces of the optical fiber fixing part. When the above $V_1$ is determined, volume(s) of optical fiber fitting portion(s) obtained when end portions of the optical fiber fitting portion(s) (end portions in longitudinal direction) are assumed to be closed are not included in the above volume $V_1$. It is also assumed that a perpendicular plane including a boundary line between the optical fiber fixing part and the lower-staged part is present in the boundary between the optical fiber fixing part and the lower-staged part, and that the above perpendicular plane is also included as one of surfaces of the optical fiber fixing part.

In the present specification, further, the above $V_2$ refers to a volume defined by planes when it is assumed that the planes surround the lower-staged part of an optical fiber fixing member, which is to be produced by a mold shaping method, by circumscribing all the surfaces of the lower-staged part. Further, it is also assumed that a perpendicular plane like that in the above $V_1$ is present in the boundary between the optical fiber fixing part and the lower-staged part and that the perpendicular plane is also included as one of surfaces of the lower-staged part.

In the present specification, the above $v_1$ and $v_2$ refer to actual volumes of the large-thickness portion and the small-thickness portion of the preform. For determining the above $v_1$ and $v_2$, it is assumed that a perpendicular plane (flat plane or curved plane) including a boundary line between the large-thickness portion and the small-thickness portion is present in the boundary between the large-thickness portion and the small-thickness portion.

When the above volume ratio is less than 0.001, the deformation of the large-thickness portion during mold shaping is small, the transferability of a pattern for optical fiber fitting portion(s) in particular is therefore liable to decrease, and it is difficult to form optical fiber fitting portion(s) as desired. When the above volume ratio exceeds 0.10, a shapable material is filled in the optical fiber fixing part side to excess in some cases, or the filling of a shapable material on the lower-staged part side is deficient in some cases. The above volume ratio is more preferably 0.002 to 0.100, particularly preferably 0.005 to 0.07.

The large-thickness portion may be any large-thickness portion so long as the cross-sectional form taken by cutting the large-thickness portion in a direction at right angles with the direction in which the preform is viewed as a front view (the above cross-sectional form will be simply referred to as "cross-sectional form of large-thickness portion" hereinafter) is not extremely deformed. Practically, the large-thickness portion preferably has the cross-sectional form of a polygon having sides whose number is equivalent to, or greater than, that of a tetragon, a semi-circle, a vault, any one of forms obtained by rounding corners of these, an ellipse, a circle or any one of forms similar to these. When the large-thickness portion is formed so as to have the above cross-sectional formed by straight line(s) and a curved line convexed outwardly (semi-circle, vault, etc.), preferably, the form of the preform as a whole is designed such that the transfer-shaping surface of a shaping mold for shaping optical fiber fitting portion(s) and the peak portion of the outwardly convexed curved surface of the large-thickness portion come into contact with each other at an initial stage of mold shaping.

The small-thickness portion is shaped into the lower-staged part of an optical fiber fixing member by mold shaping. The lower-staged part is in the state of a thin sheet of which the upper surface is flat, or in the state of a thin sheet whose upper surface has desired concave portion(s) around which a flat surface is/are formed, depending upon use. It is therefore preferred to select the cross-sectional form of the small-thickness portion of the preform (which means a cross-sectional form taken by cutting the small-thickness portion in a direction at right angles with the direction in which the preform is viewed as a front view, and is used in this sense hereinafter) as required depending upon the lower-staged part of an optical fiber fixing member to be produced. However, even when an optical fiber fixing member having concave portion(s) in the lower-staged part is produced, generally, the form(s) of the above concave portion(s) is/are a relatively easily mold-shapable form(s), and it therefore causes no practically serious problem if the above upper surface of the small-thickness portion is assumed to be a flat surface or a curved surface which is almost flat.

FIGS. 3 to 8 show some examples of the form of the preform of the present invention.

Figure 3:
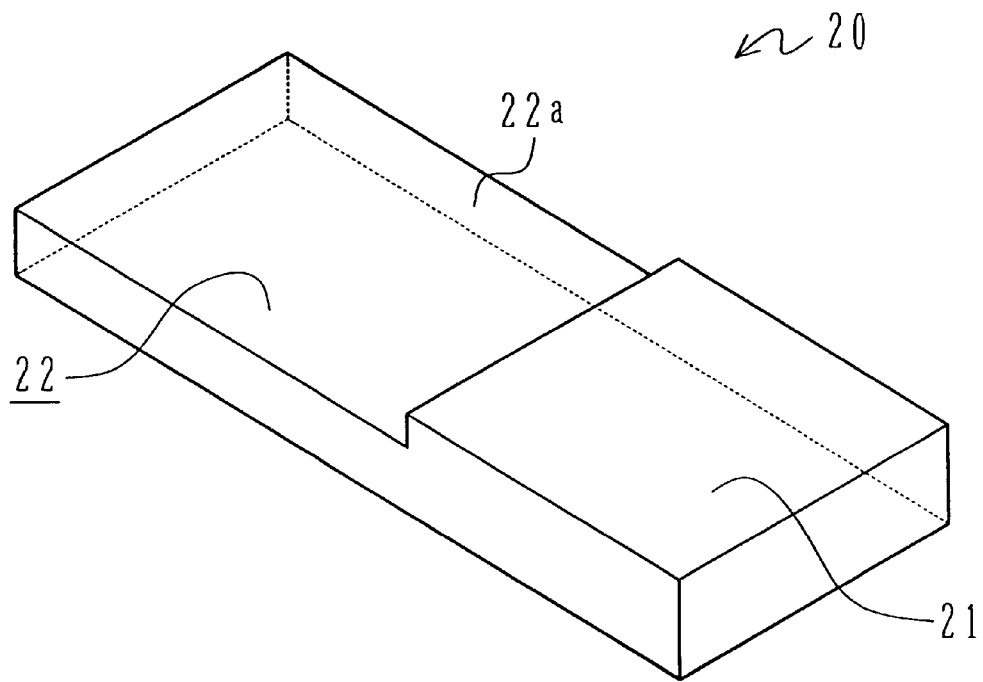
FIGS. 3 to 7 are schematic perspective views of form examples of preforms of the present invention.

A preform 20 shown in FIG. 3 has the form of a square pole part of which is cut off, and a large-thickness portion 21 and a small-thickness portion 22 have cross sections which differ in size and form but have rectangular forms as well.

Figure 4:
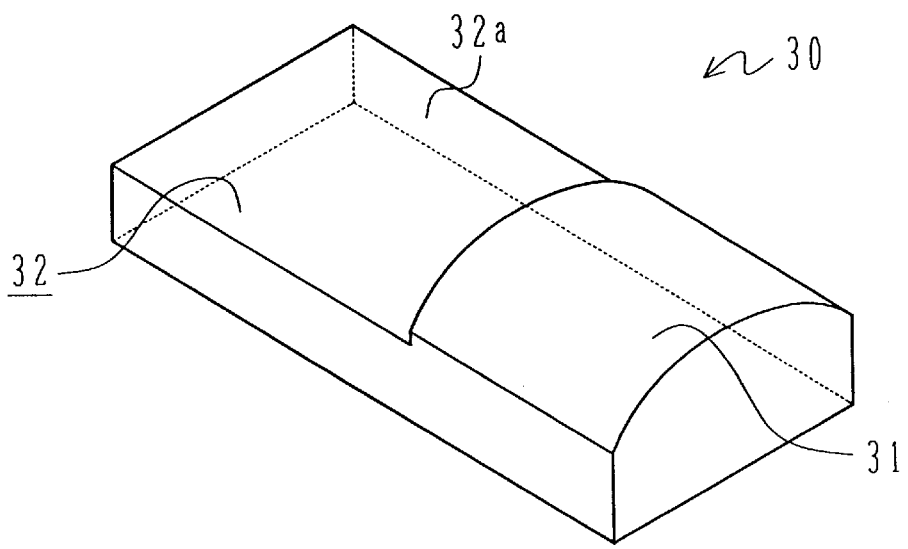

A preform 30 shown in FIG. 4 has the form of a vault part of which is cut off, a large-thickness portion 31 has a cross section having the form of a vault and a small-thickness portion 32 has a cross section having the form of a rectangle.

Figure 5:
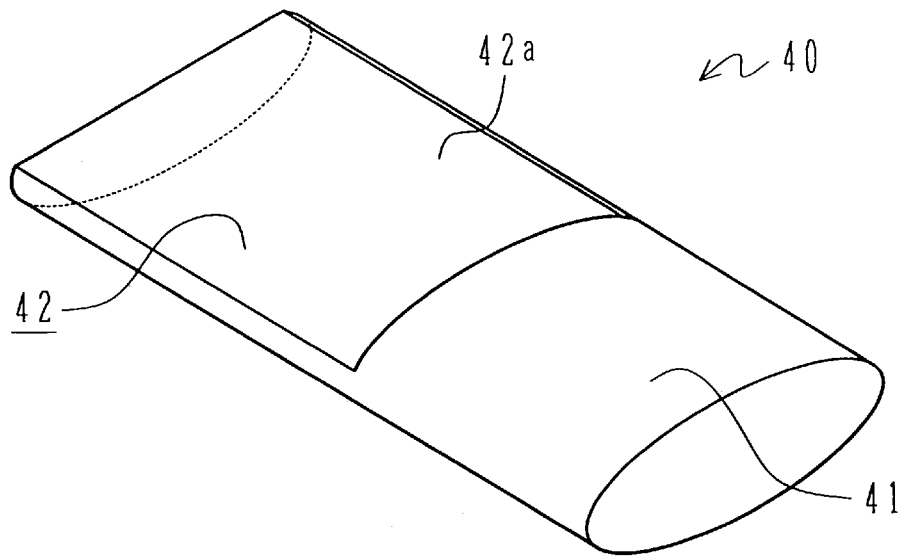

A preform 40 shown in FIG. 5 has the form of a cylindroid part of which is cut off. A large-thickness portion 41 has a cross section having the form of an ellipse, and a small-thickness portion 42 has a cross section having a form obtained by horizontally cutting off an arc-forming portion present at a predetermined level above a horizontal axis when the major axis of the above ellipse is assumed to be the horizontal axis.

Figure 6:
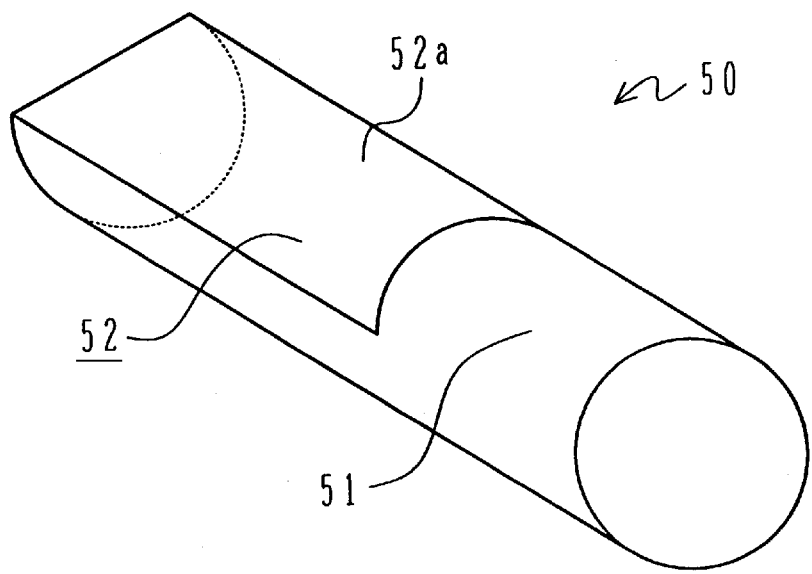

A preform 50 shown in FIG. 6 has the form of a column part of which is cut off. A large-thickness portion 51 has a cross section having the form of a circle, and a small-thickness portion 52 has a cross section having a form obtained by horizontally cutting off an circular segment present at a predetermined level above a horizontal axis when a diameter of the above circle is assumed to be the horizontal axis.

Figure 7:
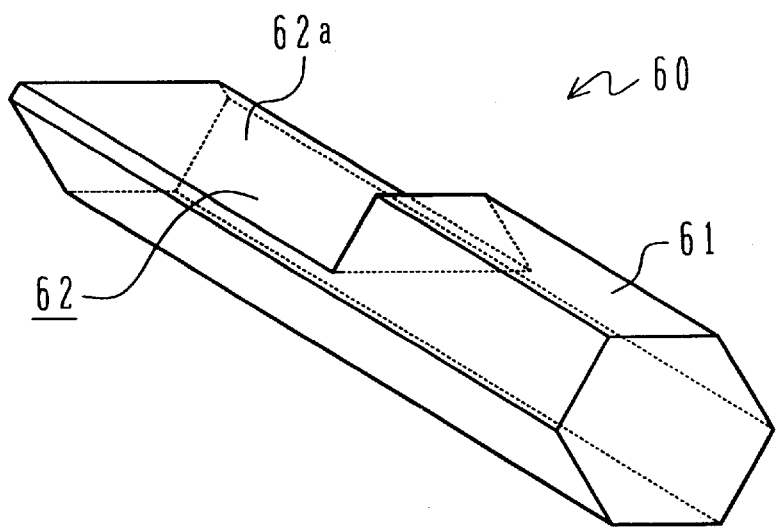

A preform 60 shown in FIG. 7 has the form of a hexagonal prism part of which is cut off. A large-thickness portion 61 has a cross section having the form of a hexagon (having three sets of two sides which are in parallel with each other and three diagonal lines two of which have equal lengths and one of which is longer than the above two diagonal lines), and a small-thickness portion 62 has a cross section having a form obtained by horizontally cutting off a portion present at a predetermined level above a horizontal axis when the largest diagonal line of the above hexagon is assumed to be the horizontal axis.

Figure 8:
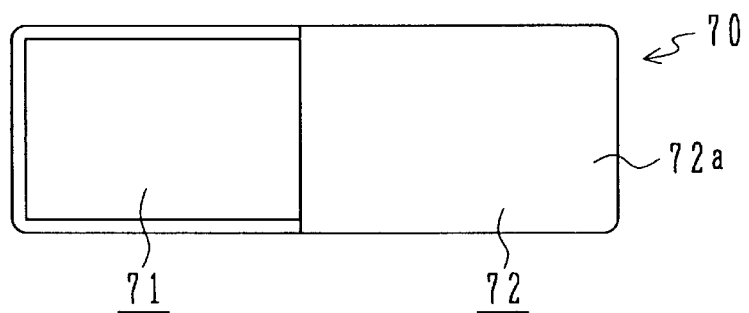
FIG. 8(a) is a schematic plan view of another example of the preform of the present invention.
FIG. 8(b) is a schematic right side view of the preform shown in FIG. 8(a)
FIG. 8(c) is a schematic front view of the preform shown in FIG. 8(a).
Figure 8:
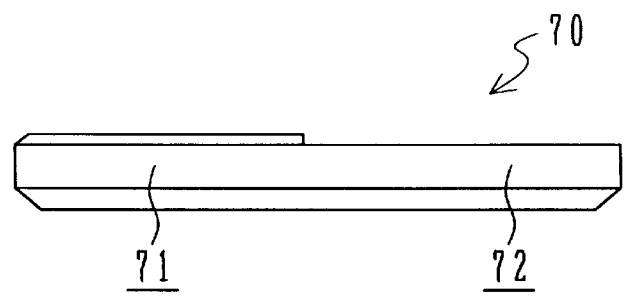
Figure 8:
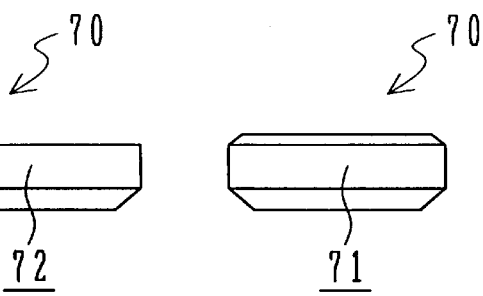

A preform 70 shown in FIG. 8 is formed by chamfering four edges surrounding one of two surfaces positioned in the thickness direction of a sheet-like rectangular prism, chamfering four edges surrounding the other of the above two surfaces to a greater degree than the above chamfering, rounding four edges extending in the thickness direction of the rectangular prism and cutting part off the side of the surface of which the four edges are chamfered to a smaller degree. In the above preform 70, a large-thickness portion 71 has a cross section having the form of an octagon, and a small-thickness portion 72 has a cross section having the form of a hexagon. Further, an edge formed by the intersection of a backside surface when the preform is viewed as a front view and an upper surface 72a of the small-thickness portion 72 is rounded to a predetermined degree.

Each of the preforms 20, 30, 40, 50 and 60 shown in FIGS. 3 to 7 show rectangular forms when viewed as plan views and show L-letter-shaped forms when viewed as side views. The preform 70 shown in FIG. 8 shows the form of a rectangle whose four corners are rounded when viewed as a plan view, and shows an L-letter-shaped form when viewed as a side view. In these preforms, each of the small-thickness portions 22, 32, 42, 52, 62 and 72 is formed so as to sink perpendicularly from each of the large-thickness portions 21, 31, 41, 51, 61 and 71, and the upper surfaces 22a, 32am 42a, 52a, 62a and 72a of these small-thickness portions 22, 32, 42, 52, 62 and 72 are planar surfaces.

As will be explained in detail concerning Process III of the present invention to be described later, preferably, predetermined site(s) of the preform of the present invention is/are chamfered or rounded depending upon a structure of a shaping mold used for mold shaping, or the preform is arranged to have a predetermined form when it is viewed as a plan view from a predetermined angle, for preventing the occurring of burrs.

The preform of the present invention is fabricated from a material which is in a solid state under an ambient temperature at which an optical fiber fixing member to be produced by a mold shaping method is used but which shows a viscosity of $10^{7.6}$ to $10^{14}$ poise when heated or from a plastic material having deformation capability equivalent thereto.

For preventing the damage of a shaping mold during mold shaping (including a case where a release film is damaged when a shaping mold has the release film), the preform of the present invention is preferably fabricated from a material which shows a viscosity of $10^{7.6}$ to $10^{14}$ poise at a temperature of approximately 850° C. or lower or a plastic material having deformation capability corresponding thereto. If an optical fiber fixing member is much deformed due to a change in ambient temperature, optical fiber(s) can no longer be fixed highly accurately with the optical fiber fixing member. It is therefore preferred to use a material having a thermal heat expansion coefficient which is as small as possible, as a material for the preform of the present invention. A preform having a small thermal expansion coefficient is also preferred for producing a mold-shaped article having high accuracy of pattern transfer and a decreased inner strain.

From the above viewpoints, the preform of the present invention is preferably formed of glass. As the above glass, glass having a yield point of approximately 850° C. or lower, preferably 750° C. or lower, is preferred, and the glass is more preferred if it has an average thermal expansion coefficient of $70 \times 10^{-7}$/° C. or less between $-50°$ C. and $+100°$ C.

Further, for obtaining a preform which is easily shapable to an optical fiber fixing member having optical fiber fitting portion(s) formed with high accuracy of pattern transfer, the preform of the present invention is preferably adjusted to have an average roughness of 1 $\mu$m or less on that portion of the surface of the large-thickness portion of the preform which is to be brought into contact, during mold shaping, with that transfer-shaping surface of a shaping mold which is for shaping the optical fiber fitting portion(s).

The preform of the present invention has the specified large-thickness portion and the specified small-thickness portion and therefore permits the formation of optical fiber fitting portion(s) in an optical fiber fixing member by transfer and the formation of a lower-staged part in the optical fiber fixing member concurrently and easily. An optical fiber fixing member having a desired appearance can be therefore obtained with high producibility at high yields of non-defective products.

Further, the preform of the present invention can give an optical fiber fixing member which does not easily break for the following reason.

That is, when a preform having a substantially uniform thickness is used for producing an optical fiber fixing member having the optical fiber fixing part and the lower-staged part by a mold shaping method, the flow of a shapable material which takes place between a portion to be shaped into the optical fiber fixing part and a portion to be shaped into the lower-staged part during mold shaping increases, and a large residual strain occurs in a boundary between the optical fiber fixing part and the lower-staged part of the obtained optical fiber fixing member. As a result, the above boundary portion decreases in strength and is liable to be broken. On the other hand, since the preform of the present invention has the large-thickness portion and the small-thickness portion, the flow of a shapable material which takes place between a portion to be shaped into the optical fiber fixing part and a portion to be shaped into the lower-staged part during mold shaping is decreased. In the obtained optical fiber fixing member, therefore, the residual strain in the boundary between the optical fiber fixing part and the lower-staged part decreases. As a result, the above boundary portion is improved in strength and is no longer easily breakable.

For producing an optical fiber fixing member in which a strain in a mold-shaped article as a whole is decreased so as to make it as small as possible and optical fiber fitting portion(s) is/are formed by highly accurate pattern transfer, preferably, the ratio t/T in which T is a maximum thickness of the optical fiber fixing part of the intended optical fiber fixing member and t is a maximum thickness of the large-thickness portion of the preform is arranged to be between 1.001 and 2.5 as described already. From the same view point, further, it is preferred to allow the large-thickness portion and the small-thickness portion to share the volume of the preform as follows as described already.

That is, the volume of the preform is preferably divided such that the volume ratio $[(v_1/V_1)-(v_2/V_2)]$ is between 0.001 and 0.1, in which $V_1$ is a volume of the optical fiber fixing part of an intended optical fiber fixing member, $V_2$ is a volume of the lower-staged part of the optical fiber fixing member, $v_1$ is a volume of the large-thickness portion of the preform and $v_2$ is a volume of the small-thickness portion of the preform.

When the preform of the present invention which is chamfered or rounded as predetermined is used, the preform can be placed in the center of a shaping mold and can be easily mold shaped for the following reason.

That is, the degree of the chamfering or the rounding is adjusted in the above preform, whereby the preform can secure a thickness and a volume necessary for obtaining an intended optical fiber fixing member even if the width and the length of the preform viewed as a plan view are almost equivalent to the width and the length of a cavity of a shaping mold viewed as a plan view. And, when the width and the length of the preform viewed as a plan view are arranged to be almost equivalent to the width and the length of a cavity of a shaping mold viewed as a plan view, the preform can be easily placed in the center of the shaping mold, and the preform can be mold shaped in this state.

Further, when edge(s) of the preform is/are chamfered or rounded, the edge(s) is/are not likely to chip, and the handling of the preform is therefore made easy. Further, when the preform having edge(s) which is/are chamfered or rounded as desired is mold shaped, and if mold shaping is carried out such that surface(s) formed by the above chamfering or rounding is/are retained as edge(s) (strictly, chamfered surface or rounded surface) of a shaped optical fiber fixing member, the optical fiber fixing member is not likely to undergo chipping from the above edge(s), so that the handling of the optical fiber fixing member is made easy.

The preform of the present invention having the above-explained advantages is particularly suitable for producing the following optical fiber fixing members (i), (ii) or (iii) with high producibility at high yields of non-defective products by mold shaping. (i) An optical fiber fixing member in which a height-level difference between the optical fiber fixing part and the lower-staged part is about 10% or more of the maximum thickness T of the optical fiber fixing part. (ii) An optical fiber fixing member having about 7% by volume or more of the optical fiber fixing member cut off when it is assumed that there is an optical fiber fixing member whose optical fiber fixing part cross-sectional form continues unchanged all through the length of the above assumed optical fiber fixing member and when it is assumed that the lower-staged part of the optical fiber fixing member as an end product is formed by cutting off part of the above-assumed optical fiber fixing member. (iii) An optical fiber fixing member in which the length of the lower-staged part based on the total length (length in the depth direction when the optical fiber fixing member is viewed as a front view) is about 15% or more.

Process I of the present invention will be explained hereinafter.

Process I of the present invention is suitable for producing the above preform of the present invention. In process I, as described already, there is prepared a material for the preform, which material has a thickness equivalent to, or greater than, a maximum thickness of the preform, the said material is partly ground to form a small-thickness portion and then the material is prepared into a material having a size which, as a plan view, is equivalent to, or greater than, the size of the preform as a plan view, or the material is prepared into a material having a size which, viewed as a plan view, is equivalent to, or greater than, the size of the preform as a plan view and then the material is partly ground to form a small-thickness portion, and preparing said material into a shaped material having (i) a large-thickness portion and (ii) a small-thickness portion having an upper surface or a peak portion formed in a position lower than the upper surface or the peak portion of the said large-thickness portion, wherein the said small-thickness portion is formed adjacent to the said large-thickness portion, the form of the shaped material viewed as a plan view parallels with the form of an intended optical fiber fixing member viewed as a plan view and the form of the shaped material viewed as a side view parallels with the form of the intended optical fiber fixing member viewed as a side view.

The material for the preform is already explained with regard to the preform of the present invention, and the explanation thereof is therefore omitted. Further, the form of the material can be properly selected by taking account of the form and the mass-producibility of an intended preform. For example, a sheet like material can be used as a material for a preform having a large-thickness portion having a rectangular cross section. However, the thickness of the material is required to be equivalent to, or greater than, the maximum thickness of the preform as described above.

When the thickness of the above material is equivalent to the maximum thickness of the intended preform, the preform can be produced by any one of the following methods (i) to (vi).

(i) A small-thickness portion is formed in the above material, and then, the above shaped material having a size which, viewed as a plan view, is equivalent to the size of an intended preform as a plan view is prepared, whereby the intended preform is obtained.

(ii) A small-thickness portion is formed in the above material, then, the above shaped material having a size which, viewed as a plan view, is a little larger than the size of an intended preform as a plan view is prepared, and then, the shaped material is polished so as to have a size which, viewed as a plan view, is equivalent to the size of the above preform as a plan view, whereby the intended preform is obtained.

(iii) The above material is cut so as to obtain a block having a size which, viewed as a plan view, is equivalent to the size of an intended preform as a plan view, and a small-thickness portion is formed in the block to obtain the above shaped material, whereby the intended preform is obtained.

(iv) The above material is cut so as to obtain a block having a size which, viewed as a plan view, is a little larger than the size of an intended preform as a plan view, a small-thickness portion is formed in the block, and the block is polished so as to have a size which, viewed as a plan view, is equivalent to the size of the intended preform as a plan view, to obtain the above shaped material, whereby the intended preform is obtained.

(v) The above material is cut so as to obtain a block having a size which, viewed as a plan view, is a little larger than the size of an intended preform as a plan view, the block is polished so as to have a size which, viewed as a plan view, is equivalent to the size of the intended preform as a plan view, and then a small-thickness portion is formed in the block to obtain the above shaped material, whereby the intended preform is obtained.

(vi) Any one of the above methods is carried out, and desired edge(s) is/are chamfered or rounded at any step, whereby an intended preform is obtained.

Specifically, the method (vi) in which, for example, the method (iii) and the chamfering of desired edges are combined includes, for example, two methods shown in FIGS. 9(a) to FIG. 9(e).

Figure 9:
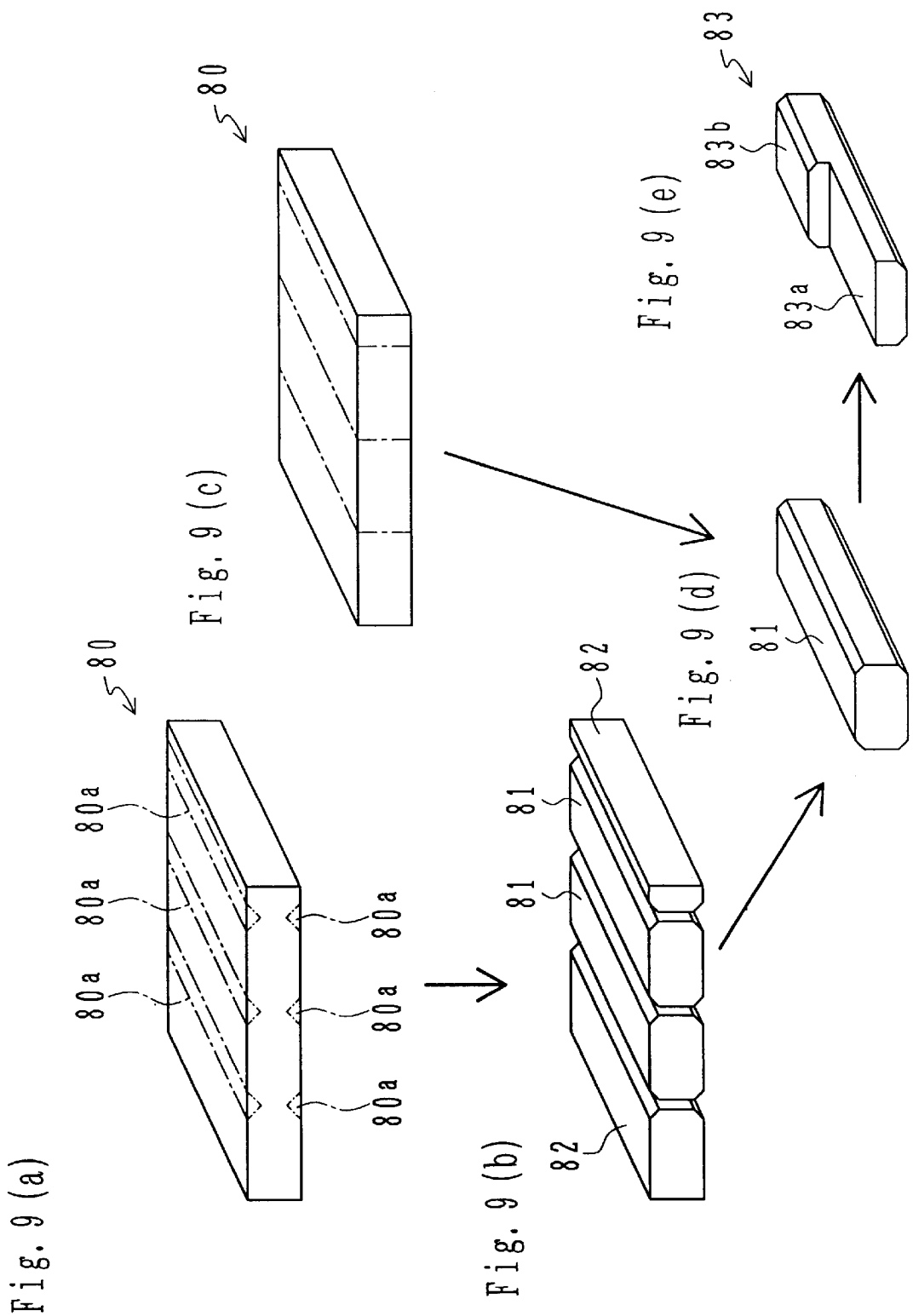
FIGS. 9(a)–9(e) provide a schematic flow chart of the process for the production of a preform according to Process IA of the present invention.

One method shown in FIG. 9 is a method in which a sheet-like material 80, for example, formed of glass, is used as a material for a preform, and the sheet-like material 80 is processed in the order of FIG. 9(a), FIG. 9(b) and FIG. 9(d) to obtain a preform 83 shown in FIG. 9(e) (the above method will be referred to as "Process IA" hereinafter).

In Process IA, first, a predetermined number of grooves 80a having a V-letter-shaped cross section in a width direction (the grooves will be referred to as "V-shaped grooves" hereinafter) are formed in each surface of a sheet-like material 80 at predetermined intervals as shown in FIG. 9(a). The V-shaped grooves are formed such that the V-shaped grooves in one surface and the V-shaped grooves formed in the other surface overlap in a length direction when the sheet-like material 80 are viewed as a plan view. The formation of the V-shaped grooves 80a has the same effect on a preform as an end product as the effect produced by the chamfering of a preform. Then, the sheet-like material 80 is cut or fractured along the bottoms of the V-shaped grooves in the length direction of the V-shaped grooves, to obtain a predetermined number of blocks 81 having a size which, viewed as a plan view, is equivalent to the size of an intended preform viewed as a plan view.

As shown in FIGS. 9(b) and 9(d), each of the thus-obtained blocks 81 has a form obtained by chamfering a rectangular prism having a size and a form which, viewed as a plan view and a side view, are equivalent to the size and the form of the above block viewed as a plan view and a side view, as predetermined, that is, each has a form obtained by chamfering those four edges of the above rectangular prism which extend in the length direction of the rectangular prism. In FIG. 9(b), numerals 82 indicate fragments remaining when two blocks 81 are produced from the sheet-like material 80.

Then, the predetermined region of the above block 81 is machined to form a small-thickness portion, whereby there is obtained a preform 83 having the above small-thickness portion 83a and a large-thickness portion 83b which is a region other than the above small-thickness portion 83a as shown in FIG. 9(e).

In Process IA shown in FIG. 9, processing is carried out such that the length direction of the V-shaped groove 80a and the length direction of the small-thickness portion 83a are in parallel, while the small-thickness portion 83a may be formed such that the length direction thereof is substantially at right angles with the length direction of the V-shaped groove 80a. The number of the blocks obtained from one sheet-like material is not limited, and it may be determined as required. The size of the sheet-like material can be properly determined depending upon the number of the blocks to be produced from the sheet-like material. The number of the V-shaped grooves to be formed in the sheet-like material and there they are to be produced in the sheet-like material can be properly determined depending upon how many blocks are to be produced from the sheet-like material or depending upon where surfaces equivalent to surfaces formed by chamfering are to be formed in the blocks or further where the above surfaces are to be formed in a preform as an end product. The above sheet-like material may be provided with a predetermined number of the V-shaped grooves in a lattice pattern. When a lattice pattern of a predetermined number of V-shaped grooves are formed on each surface of the sheet-like material, there can be obtained blocks each of which is in the form of a rectangular prism chamfered in four edges of the upper surface and four edges of the bottom surface as predetermined. The V-shaped grooves may be formed only on one surface of the sheet-like material. Further, the blocks may be further chamfered or rounded in edges as desired, for example, in edges extending the thickness direction of the blocks.

The other method shown in FIG. 9 is a method in which a sheet-like material 80, for example, formed of glass, is used as a material for a preform, and the sheet-like material 80 is processed in the order of FIG. 9(c) and FIG. 9(d) to obtain a preform 83 shown in FIG. 9(e) (the above method will be referred to as "Process IB" hereinafter).

In Process IB, first, the sheet-like material 80 is cut to a predetermined size as shown in FIG. 9(c) (cutting portions are indicated by alternated long and short dash lines in FIG. 9(c)) to obtain a predetermined number of rectangular prisms each of which, viewed as a plan view, has a size equivalent to the size of an intended preform viewed as a plan view. Then, predetermined portions of each rectangular prism are chamfered, that is, those four edges of each rectangular prism which extend the length direction thereof are chamfered, to obtain a block 81 shown in FIG. 9(d). Then, a predetermined region of the block 81 is machined in the same manner as in the above Process IA to form a small-thickness portion, whereby there is obtained a preform 83 having the above small-thickness portion 83a and a large-thickness portion 83b which is a region other than the above small-thickness portion 83a as shown in FIG. 9(e).

Like Process IA, the size of the sheet-like material used as a material for a preform can be properly determined depending upon the number of the blocks to be produced from the sheet-like material. In Process IB, the above block 81 is machined to make the preform 83. However, (i) four edges of the upper surface of the above rectangular prism and four edges of the bottom surface thereof may be rounded as predetermined, to obtain an intended block, and the small-thickness portion may be formed in the block to make the preform, (ii) all the edges of the above rectangular prism taken from the sheet-like material may be chamfered or rounded as predetermined, to obtain an intended block, and the small-thickness portion may be formed in the block to make the preform.

As already described in the explanation of the preform of the present invention, for obtaining a preform which is easily shapable to an optical fiber fixing member having optical fiber fitting portion(s) formed with high accuracy of pattern transfer, preferably, the preform is adjusted to have an average roughness of 1 μm or less on that portion of the surface of the large-thickness portion of the preform which is to be brought into contact, during mold shaping, with that transfer-shaping surface of a shaping mold which is for shaping the optical fiber fitting portion(s). When a material (for a preform) having a thickness equivalent to the maximum thickness of the preform to be produced is used, preferably, the material is surface-polished in advance so as to have the desired average roughness for obtaining the above preform.

When a material which is surface-polished to have the desired average roughness is used, there can be easily obtained a preform having the desired average roughness on that portion of the surface of its large-thickness portion which is to be brought into contact, during mold shaping, with that transfer-shaping surface of a shaping mold which is for shaping the optical fiber fitting portion(s).

Further, when a material having an average surface roughness greater than the desired value (having a rough surface) is used as a material for a preform, polishing is carried out at a desired step during the process for the production of the preform from the above material, whereby the preform having the desired average roughness can be obtained. In this case, the material for the preform is selected from materials having a thickness greater than the maximum thickness of the preform by a portion to be polished off, and either a small-thickness portion is formed in the selected material, followed by the polishing of the material, or the selected material is polished, followed by the formation of a small-thickness portion in the material, to obtain a shaped material in which that surface of the large-thickness portion which is on the side of the upper surface or the peak portion of the small-thickness portion (the portion which is to be brought into contact, during mold shaping, with that transfer-shaping surface of a shaping mold which is for shaping the optical fiber fitting portion(s)) has an average roughness of the desired value.

(i) The above polishing is carried out before the formation of the small-thickness portion in a material for a preform, followed by the preparation of the material into a size which, viewed as a plan view, is equivalent to the size of the preform viewed as a plan view.

(ii) Even after the small-thickness portion is formed in the material for the preform, the above polishing is carried out before the preparation of the material into a size which, viewed as a plan view, is equivalent to the size of the preform viewed as a plan view. In these cases, when the above shaped material is obtained, the preform as an end product is obtained.

(iii) A material having a thickness greater than the maximum thickness of the preform by a portion to be polished off is used as a material for a preform, the above polishing is carried out after or before the formation of the above small-thickness portion, and then the material is prepared into the above shaped material having a size which, viewed as a plan view, is greater than the size of the preform viewed as a plan view. In this case, the shaped material is polished so as to have a size which, viewed as a plan view, is equivalent to the size of the preform viewed as a plan view, and if the small-thickness portion is not yet formed, the small-thickness portion is formed before or after the above polishing, whereby the preform as an end product is obtained.

Therefore, "preparing a material for the said preform, the material having a thickness equivalent to, or greater than, a maximum thickness of the said preform" in Process I means preparing a material for the preform, the material having a thickness which is equivalent to the maximum thickness of the preform or greater by a portion which is to be polished off. Further, "preparing the said material into a material having a size which, viewed as a plan view, is equivalent to, or greater than, the size of the preform as a plan view" in Process I means preparing a material having a size which, viewed as a plan view is equivalent to the size of the preform or greater by a portion to be polished off, at a stage before or after the formation of the small-thickness portion in the material.

For preventing damage of surfaces formed by the polishing, preferably, the polishing is carried out at a final step during the process of producing the preform. In particular, when that surface of the large-thickness portion surfaces of the preform which is to come into contact, during mold shaping, with that transfer-shaping surface of a shaping mold which is for shaping optical fiber fitting portion(s) is polished so as to have an average roughness of 1 μm or less, preferably, the above polishing is carried out at a final stage during the process of producing the preform.

As explained with regard to the preform of the present invention, preferably, the ratio t/T in which T is a maximum thickness of the optical fiber fixing part of the intended optical fiber fixing member and t is a maximum thickness of the large-thickness portion of the preform is arranged to be between 1.001 and 2.5. In Process I, therefore, the preform is preferably produced such that it satisfies the ratio t/T in the above range as well.

Further, as explained with regard to the preform of the present invention, preferably, the volume of the preform is preferably divided such that the volume ratio $[(v_1/V_1)-(v_2/V_2)]$ is between 0.001 and 0.1, in which $v_1$ is a volume of the large-thickness portion of the preform, $v_2$ is a volume of the small-thickness portion of the preform, $V_1$ is a volume of the optical fiber fixing part of an optical fiber fixing member to be produced from the preform and $V_2$ is a volume of the lower-staged part of the optical fiber fixing member. In Process I, therefore, the preform is preferably produced such that it satisfies the volume ratio $[(v_1/V_1)-(v_2/V_2)]$ in the above range as well.

Process I of the present invention is particularly suitable for producing preforms having the large-thickness portions whose cross-sections have the form of a rectangle, a rectangle with rounded corners, a polygon having sides whose number is equivalent to, or greater than, that of a tetragon, and a polygon having sides whose number is equivalent to, or greater than, that of a tetragon and rounded corners.

Process II of the present invention will be explained hereinafter.

Process II of the present invention is as well suitable for producing the preform of the present invention as Process I explained above. In Process II, as already described, a material for the above preform is cast into a die in a state where the material is imparted with a flowability, and solidified, and the solidified product is released from the die, to obtain the preform as an end product, i.e., the already explained preform of the present invention. Process II is therefore a process for producing a preform by a so-called casting method.

Specific properties of the material for the preform are already explained with regard to the preform of the present invention, and an explanation thereof is therefore omitted. The form of the die (form of cavity) used in Process II is properly determined depending upon the form of the preform as an end product.

As explained with regard to the preform of the present invention, preferably, the ratio t/T in which T is a maximum thickness of the optical fiber fixing part of the intended optical fiber fixing member and t is a maximum thickness of the large-thickness portion of the preform is arranged to be between 1.001 and 2.5. In Process II, therefore, the preform is preferably produced such that it satisfies the ratio t/T in the above range as well.

Further, as explained with regard to the preform of the present invention, preferably, the volume of the preform is preferably divided such that the volume ratio $[(v_1/V_1)-(v_2/V_2)]$ is between 0.001 and 0.1, in which $v_1$ is a volume of the large-thickness portion of the preform, $v_2$ is a volume of the small-thickness portion of the preform, $V_1$ is a volume of the optical fiber fixing part of an optical fiber fixing member to be produced from the preform and $V_2$ is a volume of the lower-staged part of the optical fiber fixing member. In Process II, therefore, the preform is preferably produced such that it satisfies the volume ratio $[(v_1/V_1)-(v_2/V_2)]$ in the above range as well.

Process II of the present invention is particularly suitable for producing a preform having a large-thickness portion whose cross section has a form surrounded by a curved line (a circle, an ellipse, etc.) or a preform having a large-thickness portion whose cross section has a form surrounded by a curved line and straight line(s) (a semi-circle, a vault, etc.).

As an optical fiber fixing member having an optical fiber fixing part and a lower-staged part, there is known a type of an optical fiber fixing member having side walls on marginal portions of its lower-staged part. If the large-thickness portion of the preform of the present invention is modified as required, a preform suitable for the production of the above type of an optical fiber fixing member by mold shaping can be easily obtained by Process I or Process II.

Figure 10:
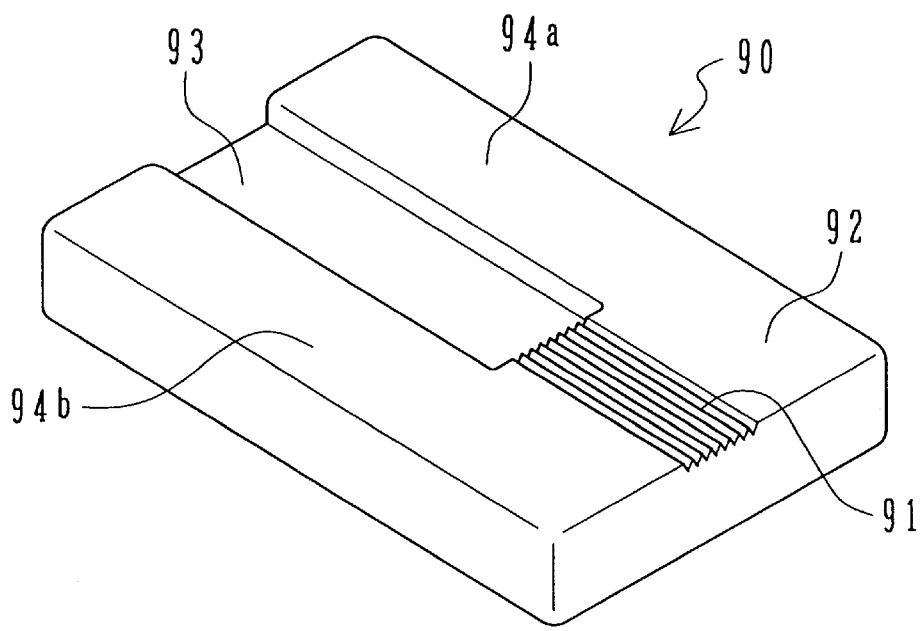
FIG. 10(a) is a schematic perspective view of one example of an optical fiber fixing member of a type having a side wall portion on each side of a lower-staged part.
FIG. 10(b) is a schematic perspective view of another example of an optical fiber fixing member of a type having a side wall portion on each side of a lower-staged part.
Figure 10:
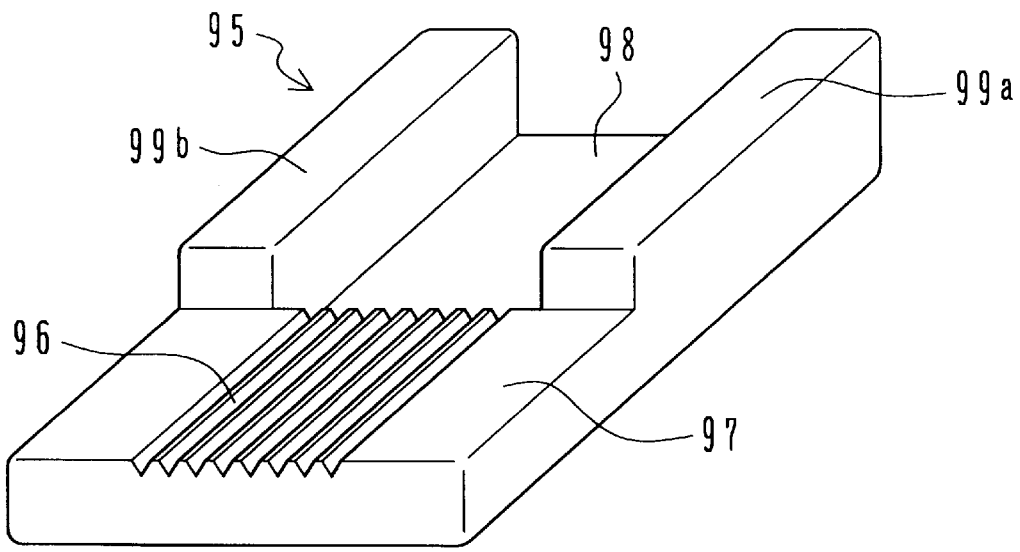

For example, the form of a preform is selected such that the right marginal portion and the left marginal portion of the large-thickness portion of the preform viewed as a front view are extended along the small-thickness portion and that the small-thickness portion is formed between the extended portions, whereby there is obtained a preform suitable for producing an optical fiber fixing member 90 shown in FIG. 10(a) by mold shaping. This optical fiber fixing member 90 has an optical fiber fixing part 92 having an upper surface on which optical fiber fitting portions 91 are formed and a lower-staged part 93 whose upper surface is formed in a position lower than the optical fiber fitting portions 91 and further has side walls 94a and 94b whose heights are substantially the same as the height of the optical fiber fixing part 92 on the right marginal portion and the left marginal portion of the lower-staged part 93 of the optical fiber fixing member 90 viewed as a front view.

Further, the form of a preform is selected such that the right marginal portion and the left marginal portion of the large-thickness portion of the preform viewed as a front view are extended along the small-thickness portion to have the small-thickness portion between the extended portions and that the extended portions have a height greater than the height of other portion of the large-thickness portion, whereby there is obtained a preform suitable for producing an optical fiber fixing member 95 shown in FIG. 10(b) by mold shaping. This optical fiber fixing member 95 has an optical fiber fixing part 97 having an upper surface on which optical fiber fitting portions 96 are formed and a lower-staged part 98 whose upper surface is formed in a position lower than the optical fiber fitting portions 96 and further has side walls 99a and 99b whose heights are greater than the height of the optical fiber fixing part 97 on the right marginal portion and the left marginal portion of the lower-staged part 98 of the optical fiber fixing member 95 viewed as a front view.

In the optical fiber fixing member having side walls, naturally, the upper surfaces or side surfaces of the side walls are not necessarily required to be connected to the upper surface of the optical fiber fixing part. There may be a groove formed between the side wall and the optical fiber fixing part. For producing an optical fiber fixing member having the above grooves, preferably, the preform has grooves corresponding to the above grooves formed.

Optical fiber fixing members are produced one by one by mold shaping, or a mold-shaped article consisting of a plurality of optical fiber fixing members which are arranged in series, in parallel or in matrix is once produced and each optical fiber fixing member is cut off from the mold-shaped article and subjected to predetermined post-treatment as required, whereby optical fiber fixing members can be produced. If the form of the preform of the present invention is properly modified as required, a preform suitable for producing the above mold-shaped article can be easily obtained according to Process I or Process II of the present invention.

Figure 11:
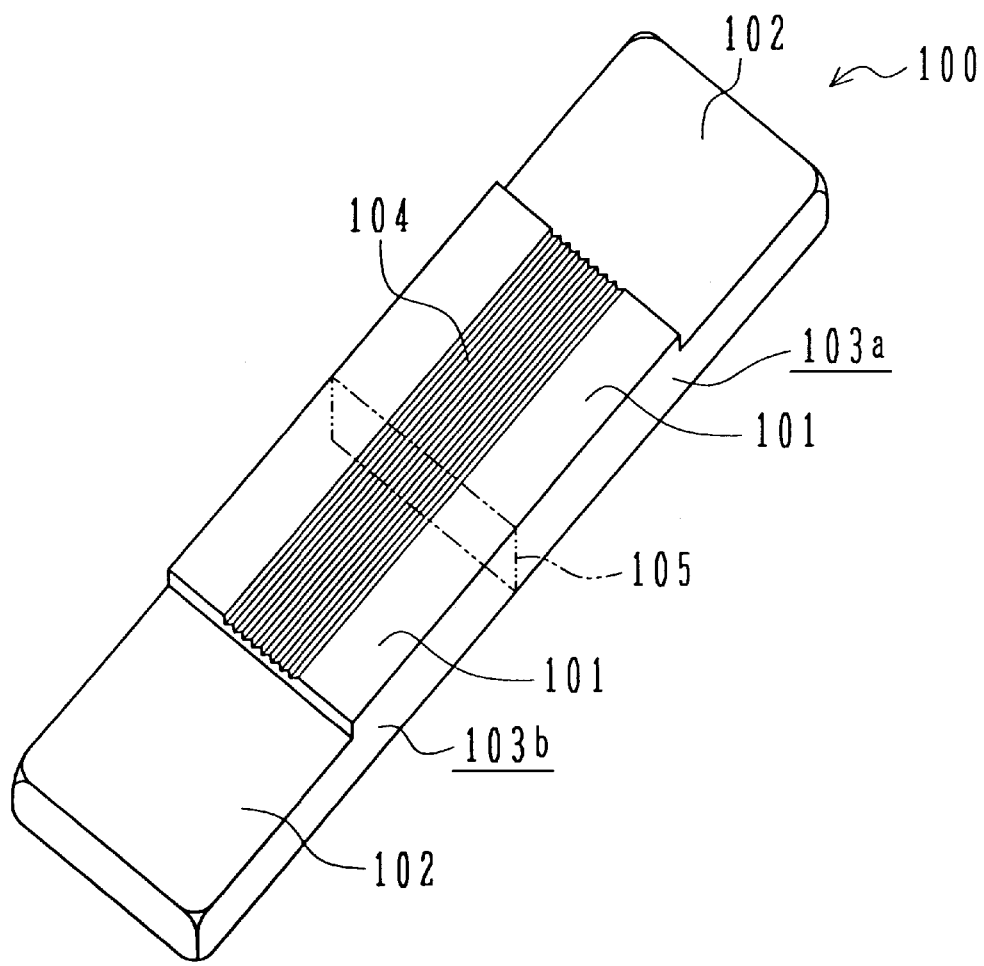
FIG. 11 is a perspective view of one example of a mold-shaped article having a form in which two optical fiber fixing members are arranged in series.

For example, if the form of preforms is selected such that two preforms are arranged in series in a state where large-thickness portions are formed in common, there can be easily obtained a mold-shaped article like a mold-shaped article 100 shown in FIG. 11, in which two optical fiber fixing members 103a and 103b having an optical fiber fixing part 101 and a lower-staged part 102 each are arranged in series in a state where the optical fiber fixing parts 101 are formed in common and optical fiber fitting portions 104 are formed in common. The two optical fiber fixing members 103a and 103b can be obtained by cutting the above mold-shaped article 100 into two parts in the direction at right angles with the length direction thereof (a cutting cross section is shown by a long and short dash line 105).

Figure 12:
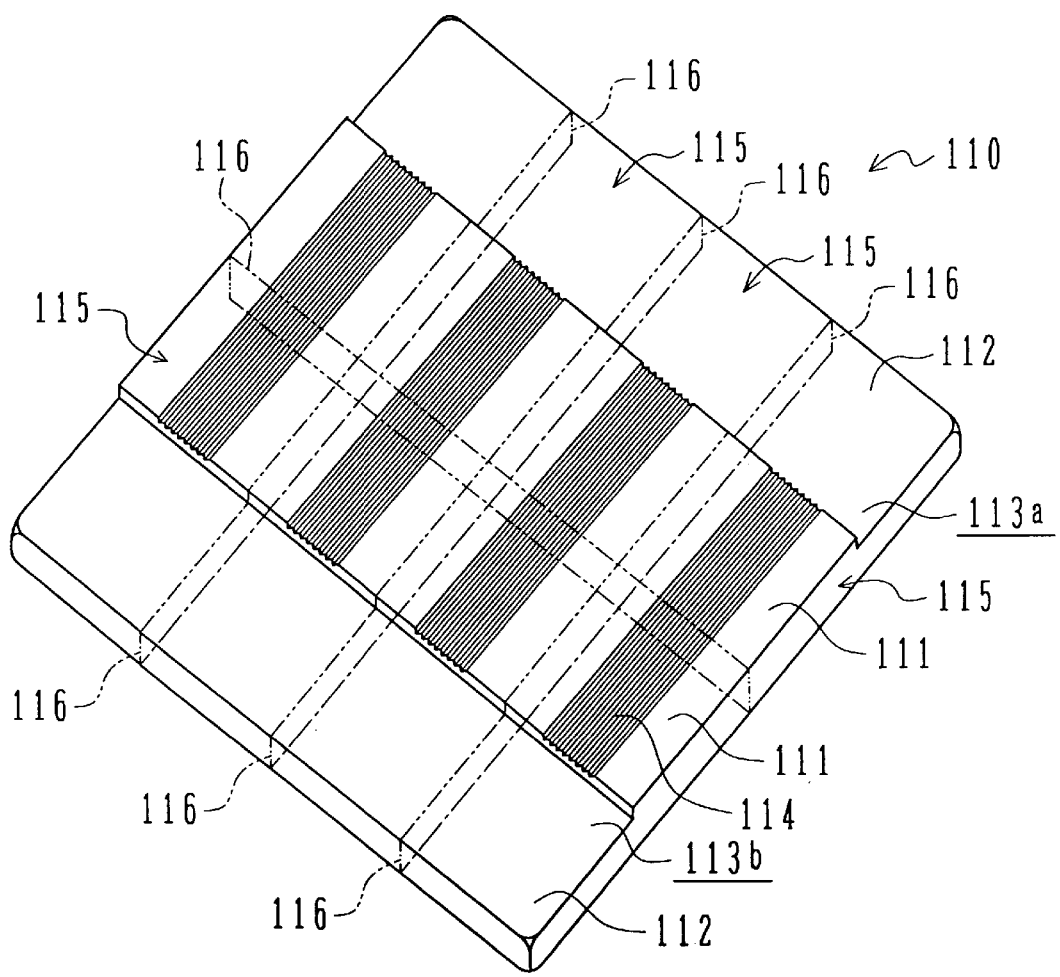
FIG. 12 is a perspective view of a mold-shaped article having a form in which eight optical fiber fixing members are arranged in a matrix form.

Further, the form of preforms are selected such that four units in each of which two preforms are arranged in series in a state where large-thickness portions are formed in common are arranged along the width direction thereof, there can be easily obtained a mold-shaped article like a mold-shaped article 110 shown in FIG. 12. In FIG. 12, four units 115 in each of which two optical fiber fixing members 113a and 113b having an optical fiber fixing part 111 and a lower-staged part 112 each are arranged in series in a state where the optical fiber fixing parts 111 are formed in common and optical fiber fitting portions 114 are formed in common are arranged along the width direction thereof. Optical fiber fixing members 113a and 113b in the number of eight as a total can be obtained by consecutively cutting the above mold-shaped article 110 along long and short dash lines shown in FIG. 12.

Process III of the present invention will be explained hereinafter.

Process III of the present invention is a process for producing an optical fiber fixing member having an optical fiber fixing part and a lower-staged part from the already described preform of the present invention. In Process III, the above preform is mold-shaped into the optical fiber fixing member with a shaping mold having a predetermined form by pressing the preform in a direction substantially in parallel with the thickness direction of the preform.

The shaping mold used in Process III may be a mold which forms a cavity having a predetermined form according to the form of an optical fiber fixing member as an end product with two mold members (upper mold member and a lower mold member) or three mold members (upper mold member, a lower mold member and a sleeve member), or it may be a so-called "side-free" mold (having two mold members such as an upper mold member and a lower mold member). Further, each member may be composed of a single member, or it may be composed of a plurality of members.

In the above shaping mold which forms a cavity having a predetermined form with two mold members, generally, one of the upper mold member and the lower mold member works as a movable mold member which is movable in a predetermined direction (this movable mold member will be referred to as "movable mold member A" hereinafter), and the other works as a fixed mold member (this fixed mold member will be referred to as "fixed mold member A" hereinafter). In the above shaping mold which forms a cavity having a predetermined form with three mold members, generally, one of the upper mold member and the lower mold member works as a mold member movable in predetermined direction relative to the sleeve member (this movable mold member will be referred to as "movable mold member B" hereinafter) and the other works as a mold member fixed relative to the sleeve member (this fixed mold member will be referred to as "fixed mold member B" hereinafter). In the shaping mold composed of the above three mold members, the above movable mold member B actually moves in a predetermined direction in many cases, while the sleeve member and the fixed mold member B actually move linking with each other in some cases.

For easily obtaining an optical fiber fixing member having desired shaping accuracy, it is preferred to use the above mold which is designed for forming a cavity having a predetermined form with two mold members ("side-free" mold excluded) or three mold members, and it is particularly preferred to use the above mold designed for forming a cavity having a predetermined form with three mold members.

In view of the prevention of occurrence of burrs on a mold-shaped article, it is preferred to use a mold which is included in the above mold designed for forming a cavity having a predetermined form with three mold members and which is used with the upper or lower mold member being tightly fixed to the sleeve member. The shaping mold of this type is described, for example, in Japanese Patent Application No. Hei 9-265719. The above shaping mold has an upper mold member, a lower mold member and a sleeve member, the upper or lower mold member is used as a movable mold member which actually moves in a predetermined direction during mold shaping, and the sleeve member is for shaping sides of a mold-shaped article with its transfer-shaping surfaces. The above sleeve member is composed of a plurality of sleeve parts each of which has a transfer-shaping surface, and when the shaping mold is used, a plurality of the above sleeve parts are pressed and fixed in a state where each is in tight contact with the side of the above upper mold member or the side of the above lower mold member.

The above shaping mold has the following advantages. (i) A subject shaping mold having desired accuracy can be easily manufactured. (ii) The occurrence of burrs from shaping can be easily prevented. (iii) When an optical fiber fixing member is produced by mold shaping, the occurrence of a fine surge (bump) is easily prevented around a end portion of the optical fiber fixing member where end portion (s) of a predetermined number of optical fiber(s) is/are to be positioned when the optical fiber(s) is/are fixed on the optical fiber fixing member.

In the above shaping mold, the sleeve member and the mold member (upper or lower mold member) tightly fixed to the sleeve member can be used as movable mold members which actually move in a predetermined direction, and the mold member (lower or upper mold member) which is not fixed to the sleeve member can be used as a fixed mold member.

Whatever shaping mold is used, each member composing the shaping mold is generally made of cemented carbide, steel or ceramic such as SiC, and the surface thereof is provided with a release film made of platinum (Pt), gold (Au), carbon (C) or diamond as required.

The preform is placed in the shaping mold or on a predetermined mold member to satisfy the following (i) and (ii). (i) The upper surface or the peak portion of the preform comes into contact with that transfer-shaping surface of the shaping mold which is form shaping optical fiber fitting portion(s) at an initial stage of mold shaping, and (ii) the boundary portion between that transfer-shaping surface of the transfer surfaces of a shaping mold which is to shape the upper surface of the optical fiber fixing part and that transfer-shaping surface which is to shape the supper surface of the lower-staged part comes into contact with the boundary portion between the large-thickness portion and the small-thickness portion of the preform at an initial stage of mold shaping. The preform is pressed in a direction which is substantially in parallel with the thickness direction thereof, to give a mold-shaped article having a predetermined form.

Particularly preferably, (iii) the shaping mold is selected so as to satisfy that the upper surface of the optical fiber fixing part (including optical fiber fitting portion(s)) and the upper surface of the lower-staged part of the optical fiber fixing member are shaped with the transfer-shaping surface of the above fixed mold member B, and (iv) the preform is placed so as to satisfy that the upper surface or the peak portion of the large-thickness portion of the preform faces the transfer-shaping surface of the above fixed mold member B.

In the shaping mold which forms a cavity having a predetermined form with three mold members, the clearance between the movable mold member B and the sleeve member is greater than the clearance between the sleeve member and the fixed mold member B since the movable mold member B is moved relatively in a predetermined direction. As a result, a shapable material is liable to be pressed into the clearance between the movable mold member B and the sleeve member. A shaping-caused burr is therefore more liable to occur on edges where surface(s) shaped with the movable mold member B and surfaces shaped with the sleeve member intersect with each other than in edges where surface(s) shaped with the fixed mold member B and surfaces shaped with the sleeve member intersect.

However, the occurrence of a burr on the edges where surface(s) shaped with the movable mold member B and surfaces shaped with the sleeve member intersect with each other can be prevented by determining the form of the preform so as to satisfy that an edge formed by the intersection of the two surfaces at an angle of 90° or smaller (this edge will be sometimes called "sharpened edge" hereinafter) is no longer present on edges surrounding surface(s) (surface (s) of the preform) which contacts the transfer-shaping surface(s) of the movable mold member B at an initial stage of mold shaping (including a point of time when the preform is placed in the shaping mold), in other words, by determining the form of the preform as follows.

That is, the form of the preform is determined so as to satisfy the following. When the preform is viewed as a plan view from the surface(s) which is/are to be brought into contact with the transfer-shaping surface(s) of the movable mold member B at an initial stage of mold shaping, at least part of contour line of the above surface(s) is formed of (i) part of one curved surface or (ii) an edge of two surfaces which intersect with each other at an angle of greater than 90°, whereby the occurrence of a burr on the edges where surface(s) shaped with the movable mold member B and surfaces shaped with the sleeve member intersect can be prevented.

The term "one curved surface" in the above (i) includes (a) a curved surface formed by rounding an edge where two surfaces intersect with each other at an acute angle, a right angle or an obtuse angle, (b) a curved surface which a preform is formed such that edges of two surfaces form, and (c) a curved surface (exclude edges where the curved surface and other surfaces intersect with each other) which a preform has as a side surface which extends beyond 180° around an axis extending from a front to a backside of the preform viewed as a front view, such as a side surface of the preform shown in FIG. 5 or 6. Further, the term "surface" in the above (ii) includes a surface formed by chamfering an edge.

Naturally, in a mold-shaped article obtained using a shaping mold which forms a cavity having a predetermined form with three mold members, there are some cases where a burr is formed on edges formed by the intersection of surface(s) formed with the fixed mold member B and surfaces formed with the sleeve member. For preventing the occurrence of a burr on the above edges, therefore, the form of a preform is determined such that no sharpened edge is present in edges surrounding surface(s) (surface(s) of the preform) which is to come to contact with the transfer-shaping surface(s) of the fixed mold member B at an initial stage of mold shaping (including a point of time when the preform is placed in the shaping mold) as described above.

When the chamfering or rounding is carried out to obtain a preform having a desired form, the degree of the chamfering or rounding required for preventing the occurrence of a burr on edges where surface(s) shaped with the fixed mold member B and surfaces shaped with the sleeve member intersect with each other can be smaller that that for preventing the occurrence of a burr on edges where surface(s) shaped with the movable mold member B and surfaces shaped with the sleeve member intersect with each other.

For example, the degree of chamfering or rounding for obtaining a preform having a form shown in FIG. 8 can be in the range of around 10% of a volume of a preform which is the same as the intended preform except that it is neither chamfered nor rounded on edges, i.e., a preform of which all the edges are sharpened edges. The degree of chamfering or rounding on the upper surface side of the large-thickness portion 71 can be about ½ of the degree of chamfering or rounding on the bottom surface side of the preform 70. In this case, the prevention of a burr caused by shaping is made easier, and it is made easier to improve the accuracy of mold shaping.

However, the shaping mold disclosed in the above Japanese Patent Application No. Hei 9-265719 has almost no clearance between the sleeve member and the fixed mold member B (lower or upper mold member) since the sleeve member is tightly fixed to the fixed mold member B. Therefore, the above shaping mold causes a burr on edges where surface(s) shaped with the fixed mold member B and surfaces shaped with the sleeve member intersect with each other among edges of a mold-shaped article to a less degree than a conventional shaping mold. When the above shaping mold is used to produce an optical fiber fixing member, therefore, the occurrence of a burr is prevented on the edges where surface(s) shaped with the fixed mold member B and surfaces shaped with the sleeve member intersect with each other among edges of a mold-shaped article even if edges surrounding that surface(s) of the preform which is/are brought into contact with the transfer-shaping surface(s) of the fixed mold member B are neither chamfered nor rounded, in other words, the above edges are sharpened edges. Even in this case, for preventing the occurrence of a burr on edges where surface(s) shaped with the movable mold member B (upper or lower mold member) and surfaces shaped with the sleeve member intersect with each other, the form of the preform is determined so as to satisfy the following. When the preform is viewed as a plan view from the surface(s) which is/are to be brought into contact with the transfer-shaping surface(s) of the movable mold member B at an initial stage of mold shaping, i.e., when the preform is viewed as a bottom view, at least part of contour line of the surface(s) (bottom surface(s)) is formed of (i) part of one curved surface or (ii) an edge of two surfaces which intersect with each other at an angle of greater than 90°.

In a small-sized preform, it is difficult to chamfer or round the upper surface side of its small-thickness portion. However, when the above shaping mold is used, and when the preform is placed in the shaping mold such that the upper surface or the peak portion of the large-thickness portion of the preform faces the transfer-shaping surface of the fixed mold member B for mold shaping, it is no longer necessary to chamfer or round the upper surface side of the small-thickness portion of the preform. As a result, desired preforms can be easily produced with high producibility, which leads to the production of desired optical fiber fixing members with ease with high producibility.

It is preferred to prevent the occurrence, to the utmost, of a shaping-caused burr on an edge where a side surface which is the front of an optical fiber fixing member viewed as a front view and the upper surface of the optical fiber fixing part of the optical fiber fixing member intersect with each other, an edge where the above side surface which is the front and the bottom surface of the optical fiber fixing member intersect with each other and edges (two edges) where each side surface which is the right or left side surface of an optical fiber fixing member viewed as a front view and the upper surface of the optical fiber fixing member intersect with each other. Regardless of the structure of a shaping mold used for mold shaping, therefore, it is preferred to chamfer or round those edges of a preform which correspond to the above edges of an optical fiber fixing member.

Mold shaping is preferably carried out at an ambient temperature at which the preform has a viscosity of $10^{7.6}$ to $10^{14}$ poise or at which the preform shows deformation capability corresponding to the above viscosity. The mold-shaping pressure is properly determined depending upon the composition of a preform, a heating temperature, a shaping time period and a deformation. When a preform formed of glass is used, it is generally in the range of from 2 to 500 kgf/cm$^2$, preferably in the range of from 20 to 300 kgf/cm$^2$. The heating time period can be approximately 5 to 250 seconds. The mold shaping is preferably carried out in an inert gas atmosphere such as a nitrogen gas atmosphere. After the mold shaping, a mold-shaped article in a mold is cooled to a temperature around the glass transition point of shaping material used at a rate of 20 to 70° C./minute, and the mold-shaped article is separated from the mold.

Process III for the production of an optical fiber fixing member, provided by the present invention, uses the already explained preform of the present invention, and Process III therefore has advantages as described with regard to the preform of the present invention, that is; (1) An optical fiber fixing member having a desired appearance can be obtained with high producibility at high yields of non-defective products, (2) there can be obtained an optical fiber fixing member which does not easily break, and (3) when the preform having edge(s) which is/are chamfered or rounded as desired is mold shaped, and if mold shaping is carried out such that surface(s) formed by the above chamfering or rounding is/are retained as edge(s) (chamfered surface or rounded surface) of a shaped optical fiber fixing member, the optical fiber fixing member is not likely to undergo chipping from the above edge(s), so that the handling of the optical fiber fixing member is made easy.

The Process III having the above advantages, provided by the present invention, is particularly suitable for producing the following optical fiber fixing member with high producibility at high yields of non-defective products. (i) An optical fiber fixing member in which the height level difference between the optical fiber fixing part and the lower-staged part is about 10% or more of the maximum thickness T of the optical fiber fixing part, (ii) an optical fiber fixing member having about 7% by volume or more of the optical fiber fixing member cut off when it is assumed that there is an optical fiber fixing member whose optical fiber fixing part cross-sectional form continues unchanged all through the length of the above assumed optical fiber fixing member and when it is assumed that the lower-staged part of the optical fiber fixing member as an end product is formed by cutting off part of the above-assumed optical fiber fixing member or (iii) an optical fiber fixing member in which the length of the lower-staged part based on the total length (length in the depth direction when the optical fiber fixing member is viewed as a front view) is about 15% or more.

The present invention will be further explained in detail with reference to Examples hereinafter, while the present invention shall not be limited to Examples.

EXAMPLE 1

(1) Preparation of preform

An optical fiber guide block 1 shown in FIG. 1 was selected as an optical fiber fixing member to be produced.

The optical fiber guide block 1 shown in FIG. 1 has an optical fiber fixing part 3 having an upper surface 3*a* in which eight optical fiber fitting portions 2 made of V grooves are formed and a lower-staged part 4 whose upper surface 4*a* is formed in a position lower than the above optical fiber fitting portions 2, and the above lower-staged part 4 is formed adjacent to the optical fiber fixing part 3. The lower-staged part 4 is formed so as to perpendicularly sink from the optical fiber fixing part 3.

When viewed as a plan view, the optical fiber fixing part 3 has a 5×5 mm rectangular form whose corners are rounded to some extent. When viewed as a front view, the optical fiber fixing part 3 has a 1.5×5 mm rectangular form whose corners are rounded to some extent (provided that the concave/convex form of the optical fiber fitting portions 2 is disregarded). The optical fiber fixing part 3 therefore has a maximum thickness T of 1.5 mm and a volume $V_1$ of 36.75 mm$^3$. When viewed as a plan view, the lower-staged part 4 has a 7×5 mm rectangular form whose corners (excluding two corners on the optical fiber fixing part 3 side) are rounded to some extent. When viewed as a front view, the lower-staged part 4 has a 1.25×5 mm rectangular form whose corners are rounded to some extent. The height-level difference between the upper surface of the lower-staged part 4 and the upper surface 3*a* of the optical fiber fixing part 3 is 0.25 mm at the largest, and the lower-staged part 4 has a volume $V_2$ of 43.75 mm$^3$.

Then, a borate glass sheet which was surface-polished on both sides and had an average roughness of 0.5 $\mu$m (thickness 3.00 mm) was used as a material for a preform. The glass sheet was ground to form a small-thickness portion in a desired region, and 100 preforms having a form similar to the form of the preform 20 shown in FIG. 3 were prepared by cutting the ground glass sheet.

As shown in Table 1, the large-thickness portion of each preform has a rectangular form of 4.10×3.00 mm when viewed as a plan view, and it has a rectangular form of 3.00×3.00 mm when viewed as a front view. The large-thickness portion of each has a maximum thickness t of 3.00 mm and a volume $v_1$ of 36.90 mm$^3$. The small-thickness portion of each preform is formed so as to perpendicularly sink from the large-thickness portion. When viewed as a plan view, the small-thickness portion has a rectangular form of 6.08×3.00 mm, and when viewed as a front view, it has a rectangular form of 2.40×3.00 mm. Therefore, the height-level difference between the upper surface of the small-thickness portion and the upper surface of the large-thickness portion is 0.60 mm, and the small-thickness portion of each has a volume $v_2$ of 43.78 mm$^3$. These preforms are formed such that the volume ratio $[(v_1/V_1)-(v_2/V_2)]$ is 0.0035, and the ratio, t/T, of the maximum thickness t of the large-thickness portion of each preform to the maximum thickness T of the optical fiber fixing part 3 of the above optical fiber guide block 1 is 2.000.

(2) Preparation of optical fiber guide block

Figure 2:
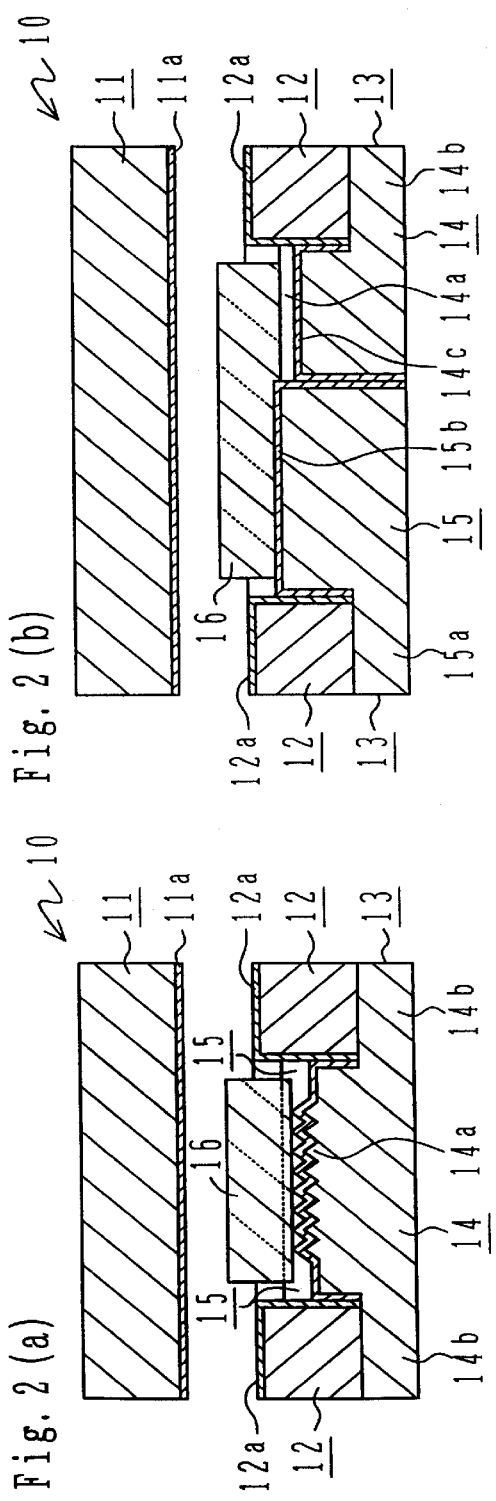
FIGS. 2(a)–2(d) are schematic cross-sectional views of a shaping mold used in Examples.

First, a shaping mold 10 composed of an upper mold member, a sleeve member and a lower mold member as shown in FIG. 2 was prepared.

The upper mold member 11 composing the shaping mold 10 is a plate-shaped mold member. One surface of the above upper mold member 11 is provided with a release film 11*a*, and the surface of the release film 11*a* works as a transfer-shaping surface. A cercumferential portion of lower surface of the upper mold member 11 is engaged with the upper surface of the sleeve member 12 to be stopped when mold shaping is carried out.

The sleeve member 12 is a cylindrical member whose horizontal cross section has a rectangular frame form, and its portions (which constitute the upper surface and the inner side surfaces at the time of use) of the sleeve member 12 are provided with a release film 12*a*.

The lower mold member 13 has a first shaping portion 14 having a transfer-shaping surface for shaping the upper surface 3*a* (including the surfaces of optical fiber fitting portions 8) of the optical fiber fixing part 3 of the optical fiber guide block 1 (see FIG. 1) and a second shaping portion 15 having a transfer-shaping surface for shaping the upper surface 4*a* of the lower-staged part 4 of the optical fiber guide block 1. The first shaping portion 14 and the second shaping portion 15 are mechanically integrated with a fixing frame (not shown).

The first shaping portion 14 has the form of a rectangular prism, and on its portion (which constitutes an upper end portion at the time of use), 8 convex portions 14*a* having a predetermined form matching the form of the optical fiber fitting portions to be shaped are formed in parallel with one another at a pitch of 250±0.3 $\mu$m. Further, the portion (which constitutes the lower end portion at the time of use) of the first shaping portion 14, excluding the surface side to contact the second shaping portion 15, is provided with a collar 14*b* for engaging with the portion (which constitutes a lower surface at the time of use) of the sleeve member 12 to stop it.

The second shaping portion 15 also has the form of a rectangular prism, and its portion (which constitutes an upper surface at the time of use) is formed of a flat surface. The upper surface of the second shaping portion 15 is projected upwardly (upwardly at the time of use) than the upper surface (flat surface excluding the 8 convex portions 14a) of the first shaping portion 14 at the time of use by 250 µm. There is therefore a height-level difference in the boundary between the first shaping portion 14 and the second shaping portion 15. Further, the portion (which constitutes the lower end portion at the time of use) of the second shaping portion 15, excluding the surface side to contact the first shaping portion 14, is provided with a collar 15a for engaging with the portion (which constitutes a lower surface at the time of use) of the sleeve member 12 to stop it.

The upper surface of the above first shaping portion 14 and side surfaces from the said upper surface to the upper surface of the collar 14b are provided with a release film 14c, and the upper surface of the second shaping portion 15 and side surfaces from the said upper surface to the upper surface of the collar 15a are provided with a release film 15b. The above eight convex portions 14a having the release film 14c have a dimensional accuracy of ±0.3 µm (dimensional accuracy of pitch and height).

During mold shaping, the lower mold member 13 is fixed, and the sleeve member 12 is disposed on the lower mold member 13 such that the lower surface of the sleeve member 12 is engaged with the collars 14b and 15a to be stopped. A preform 16 is placed as follows. The upper surface of its large-thickness portion faces the upper surface of the above first shaping portion 14, the upper surface of its small-thickness portion comes in contact with the upper surface of the second shaping portion 15, and the boundary between the large-thickness portion and the small-thickness portion meets with the boundary between the first shaping portion 14 and the second shaping portion 15 (see FIG. 2(a) and FIG. 2(b)). The preform is preferably placed as follows. If the preform placed in the shaping mold 10 is viewed as a front view to draw its cross section, the distance (shortest distance) $L_1$ between the left end of the preform and the inner side surface of the sleeve member 12 is substantially equivalent to the distance (shortest distance) $L_2$ between the right end of the preform and the inner side surface of the sleeve member 12.

The above shaping mold 10 and the above preform were used, and the preform was mold-shaped as follows to give an optical fiber guide block 1 as an end product.

The preform placed in the shaping mold 10 ($L_1=L_2$) as described above was heated together with the shaping mold 10 in a nitrogen gas atmosphere until the preform had a temperature of 580° C. (at this temperature, the glass had a viscosity of $10^8$ poise). In this state, the upper mold member 11 was moved down at a shaping pressure of 180 kgf/cm² until the upper mold member 11 was engaged with the upper surface of the sleeve member 12 to be stopped, and the preform was pressed for 200 seconds (see Table 2). FIG. 2(c) schematically shows perpendicular cross-sectional views of the shaping mold 10 and a mold-shaped article 17 in a transverse direction, and FIG. 2(d) schematically shows perpendicular cross-sectional views of the shaping mold 10 and the mold-shaped article 17 in a longitudinal direction, at the above moment. The shaping mold 10 and the mold-shaped article 17 were cooled to room temperature at a rate of 50° C./minute and then the mold-shaped article was taken out of the shaping mold 10 to obtain the optical fiber guide block 1.

The above procedures were repeated to obtain 100 optical fiber guide blocks, and each of these optical fiber guide blocks was measured for an accumulated pitch accuracy and a depth accuracy of optical fiber fitting portions 8 with a contact-type fine profile measuring device. Further, each optical fiber guide block was measured for a width and a thickness (maximum thickness) of optical fiber fixing part viewed as a front view with a micrometer, and ranges of fluctuation in these values among the optical fiber guide blocks were determined. Table 3 shows the results.

The above "accumulated pitch of optical fiber fitting portions" in the present specification stands for the following. When it is assumed that optical fibers having the same diameter are fixed in optical fiber fitting portions, a pitch from an optical fiber ("optical fiber A" hereinafter) which is fixed in the leftmost or rightmost optical fiber fitting portion to other optical fiber is determined. The accumulated pitch of optical fiber fitting portion refers to the above pitch from the optical fiber A to other optical fiber. In this Example, since there are a total of eight optical fiber fitting portions, there are seven accumulated pitches.

EXAMPLES 2–4

(1) Preparation of preform

A borate glass sheet (both surfaces were polished to have an average roughness of 0.3 µm) having a thickness of 2.25 mm (Example 2), 1.52 mm (Example 3) or 1.62 mm (Example 4) was used as a material for a preform. The borate glass sheets were ground to form a small-thickness portion, and in each Example, 100 preforms having a size shown in Table 1 were prepared by taking preforms having a form similar to the form of the preform 20 shown in FIG. 3 from the ground glass sheet.

(2) Preparation of optical fiber guide block

In each Example, 100 optical fiber guide blocks were prepared in the same manner as in Example 1 except that the preforms were replaced with the preforms obtained in the above (1) and that the conditions for mold shaping were changed to conditions shown in Table 2.

Each of the above optical fiber guide blocks in each Example was measured for an accumulated pitch accuracy and a depth accuracy of optical fiber fitting portions in the same manner as in Example 1. Further, each of the optical fiber guide blocks in each Example was measured for a width (width of optical fiber fixing part viewed as a front view) and a thickness (maximum thickness of optical fiber fixing part viewed as a front view) in the same manner as in Example 1, and ranges of fluctuation in the measurement values among the optical fiber guide blocks were determined in each Example. Table 3 shows the results.

EXAMPLE 5

(1) Preparation of preform

A borate glass sheet having a thickness of 1.85 mm was used as a material for a preform. The glass sheet was cut to obtain a 1.70×4.98×11.95 mm rectangular prism, and each of four edges surrounding one main surface ("upper surface" hereinafter) of the above rectangular prism were chamfered. Further, the other main surface ("bottom surface" hereinafter) of the above rectangular prism was also chamfered. The chamfering amount on the bottom surface side was about 2 times the chamfering amount of the upper surface side. Further, four edges of the above rectangular prism, extending in the thickness direction, were rounded to obtain a block for a preform. The total volume of portions removed by the above chamfering and the above rounding was about 10% of the volume of the rectangular prism found before the chamfering and the rounding.

After the above chamfering and rounding, a predetermined region of the block was removed by cutting, to form a small-thickness portion, and the upper surface of a large-thickness portion was polished until the surface had an average roughness of 0.3 μm, to give a preform having a form similar to the form of the preform 70 shown in FIG. 8. The above procedures were repeated to obtain 100 preforms.

(2) Preparation of optical fiber guide block

Optical fiber guide blocks in the total number of 100 were prepared in the same manner as in Example 1 except that the preforms were replaced with the preforms prepared in the above (1) and that the conditions for mold shaping were changed to conditions shown in Table 2.

Each of the optical fiber guide blocks was measured for an accumulated pitch accuracy and a depth accuracy of optical fiber fitting portions in the same manner as in Example 1. Further, each of the optical fiber guide blocks was measured for a width (width of optical fiber fixing part viewed as a front view) and a thickness (maximum thickness of optical fiber fixing part viewed as a front view) in the same manner as in Example 1, and ranges of fluctuation in the measurement values among the optical fiber guide blocks were determined. Table 3 shows the results.

EXAMPLES 6–12

The same material as that used for preforms in Example 1 was used, and 100 preforms having a form and a size shown in Table 1 were prepared according to a casting method using a die having a cavity having a predetermined form, in each Example. Then, in each Example, 100 optical fiber guide blocks were prepared in the same manner as in Example 1 except that the preforms were replaced with the above preforms and the conditions for mold shaping were changed to conditions shown in Table 2. All the preforms in Examples 6 to 12 had a form in which a small-thickness portion was formed by cutting off part of a prism-like material and the small-thickness portion was formed so as to perpendicularly sink from a large-thickness portion.

Each of the above optical fiber guide blocks was measured for an accumulated pitch accuracy and a depth accuracy of optical fiber fitting portions in the same manner as in Example 1. Further, each of the optical fiber guide blocks was measured for a width (width of optical fiber fixing part viewed as a front view) and a thickness (maximum thickness of optical fiber fixing part viewed as a front view) in the same manner as in Example 1, and ranges of fluctuation in the measurement values among the optical fiber guide blocks were determined. Table 3 shows the results.

TABLE 1

| | | Form and size of large-thickness portion | | Form and size of small-thickness portion | | | |
|---|---|---|---|---|---|---|---|
| | Method of Preparation | Viewed as plan view*1 | Viewed as front view*2 | Viewed as plan view*1 | Viewed as front (backside) view*2 | Volume ratio | t/T |
| Ex. 1 | Grinding | 4.10 × 3.00 mm rectangle | 3.00 × 3.00 mm rectangle | 6.08 × 3.00 mm rectangle | 2.40 × 3.00 mm rectangle | 0.0035 | 2.000 |
| Ex. 2 | Grinding | 4.54 × 3.60 mm rectangle | 2.25 × 3.60 mm rectangle | 6.53 × 3.60 mm rectangle | 1.86 × 3.60 mm rectangle | 0.0012 | 1.500 |
| Ex. 3 | Grinding | 4.96 × 4.88 mm rectangle | 1.52 × 4.88 mm rectangle | 6.94 × 4.88 mm rectangle | 1.29 × 4.88 mm rectangle | 0.0025 | 1.013 |
| Ex. 4 | Grinding | 4.96 × 4.88 mm rectangle | 1.62 × 4.68 mm rectangle | 6.94 × 4.88 mm rectangle | 1.38 × 4.68 mm rectangle | 0.0025 | 1.013 |
| Ex. 5 | Grinding | 4.85 × 4.98 mm rectangle, two corners were rounded*3 | 1.70 mm high octagon*4 | 7.10 × 4.98 mm rectangle, two corners were rounded*5 | Hexagon having a height of 1.36 mm*6 | 0.0025 | 1.013 |
| Ex. 6 | Casting | 4.60 × 4.55 mm rectangle | Semi-circle having a diameter of 4.55 mm | 6.60 × 4.55 mm rectangle | Height 1.48 mm, Width 4.55 mm*7 | 0.015 | 1.517 |
| Ex. 7 | Casting | 4.60 × 4.00 mm rectangle | 4.00 mm wide and 2.131 mm high vault form*8 | 6.52 × 4.00 mm rectangle | 1.65 × 4.00 mm rectangle | 0.015 | 1.421 |
| Ex. 8 | Casting | 4.75 × 4.45 mm rectangle | 4.45 mm wide and 1.913 | 6.75 × 4.45 mm rectangle | 1.45 × 4.45 mm rectangle | 0.0065 | 1.275 |
| Ex. 9 | Casting | 4.85 × 4.78 mm rectangle | 4.78 mm wide and 1.783 | 6.85 × 4.78 mm rectangle | 1.33 × 4.78 mm rectangle | 0.0046 | 1.190 |
| Ex. 10 | Casting | 4.95 × 4.50 mm rectangle | Ellipse having a major axis length of 4.50 mm and a minor axis length of 2.10 mm | 6.95 × 4.50 mm rectangle | Height 1.60 mm, Width 4.50 mm*11 | 0.031 | 1.400 |
| Ex. 11 | Casting | 3.61 × 3.60 mm rectangle | Circle having a diameter of 3.60 mm | 5.61 × 3.60 mm rectangle | Height 2.43 mm, Width 3.60 mm*12 | 0.056 | 2.400 |

TABLE 1-continued

| | Method of Preparation | Form and size of large-thickness portion | | Form and size of small-thickness portion | | | |
|---|---|---|---|---|---|---|---|
| | | Viewed as plan view*1 | Viewed as front view*2 | Viewed as plan view*1 | Viewed as front (backside) view*2 | Volume ratio | t/T |
| Ex. 12 | Casting | 4.60 × 3.60 mm rectangle | Regular hexagon having a side length of 1.80 mm and a height of 3.118 mm | 6.60 × 3.60 mm rectangle | Height 2.08 mm, Width 3.60 mm*13 | 0.082 | 2.078 |

Ex. = Example
*1: Figures in column show (length of a side extending in width direction when preform is viewed as a side view) × (length of a side extending in width direction when the preform is viewed as a front view).
*2: Figures in column show (height) × (width).
*3: Meaning two corners on a front side.
*4: An octagon having a form prepared by obliquely cutting off two corners on a top side of a 1.70 × 4.98 mm rectangle to a small degree and obliquely cutting off two corners on a bottom side of the rectangle to a large degree.
*5: Meaning two corners of a surface side which is a backside when preform is viewed as a front view.
*6: A hexagon having a form prepared by obliquely cutting off two corners on a bottom side of a 1.36 × 4.98 mm rectangle to a great degree.
*7: Having a form prepared by horizontally cutting off a circular segment on a top side of an upwardly convexed semi-circle with a diameter being a horizontal axis from the upwardly convexed semi-circle.
*8: A vault formed by placing an arch having a chord length of 4.00 mm and a height of 0.536 mm on a 1.65 × 4.00 mm rectangle.
*9: A vault formed by placing an arch having a chord length of 4.45 mm and a height of 0.596 mm on a 1.45 × 4.45 mm rectangle.
*10: A vault formed by placing an arch having a chord length of 4.78 mm and a height of 0.64 mm on a 1.33 × 4.78 mm rectangle.
*11: Having a form prepared by horizontally cutting off an arch portion present at a predetermined height from a horizontal axis of an ellipse when the major axis of the ellipse is the horizontal axis.
*12: Having a form prepared by horizontally cutting off a circular segment present at a predetermined height from a horizontal axis of a circle when a diameter of the circle is the horizontal axis.
*13: Having a form prepared by horizontally cutting off a portion present at a predetermined height from a horizontal axis of a regular hexagon when one diagonal line of the regular hexagon is the horizontal axis.

TABLE 2

| | Highest molding temperature (° C.) | Viscosity of glass (poise) | Pressure (kgf/cm$^2$) | Pressing time period (second) | Cooling rate (° C./minute) |
|---|---|---|---|---|---|
| Ex. 1 | 580 | $10^8$ | 180 | 200 | 50 |
| Ex. 2 | 565 | $10^{10}$ | 160 | 180 | 50 |
| Ex. 3 | 540 | $10^{13}$ | 100 | 100 | 60 |
| Ex. 4 | 550 | $10^{11}$ | 100 | 100 | 60 |
| Ex. 5 | 545 | $10^{12}$ | 120 | 120 | 60 |
| Ex. 6 | 560 | $10^{11}$ | 160 | 120 | 55 |
| Ex. 7 | 555 | $10^{11}$ | 160 | 100 | 55 |
| Ex. 8 | 545 | $10^{12}$ | 160 | 150 | 55 |
| Ex. 9 | 555 | $10^{12}$ | 160 | 130 | 55 |
| Ex. 10 | 540 | $10^{13}$ | 100 | 120 | 60 |
| Ex. 11 | 570 | $10^9$ | 180 | 180 | 50 |
| Ex. 12 | 570 | $10^9$ | 180 | 200 | 50 |

Ex. = Example

TABLE 3

| | Optical fiber fitting portions | | Optical fiber guide block | |
|---|---|---|---|---|
| | Accumulated pitch accuracy | Depth accuracy | Range fluctuation in width values | Range fluctuation in thickness values |
| Ex. 1 | within ±0.5 μm | within ±0.5 μm | within ±1 μm | within ±8 μm |
| Ex. 2 | within ±0.5 μm | within ±0.5 μm | within ±1 μm | within ±8 μm |
| Ex. 3 | within ±0.5 μm | within ±0.5 μm | within ±1 μm | within ±8 μm |
| Ex. 4 | within ±0.5 μm | within ±0.5 μm | within ±1 μm | within ±5 μm |
| Ex. 5 | within ±0.5 μm | within ±0.5 μm | within ±1 μm | within ±5 μm |
| Ex. 6 | within ±0.5 μm | within ±0.5 μm | within ±1 μm | within ±10 μm |
| Ex. 7 | within ±0.5 μm | within ±0.5 μm | within ±1 μm | within ±10 μm |
| Ex. 8 | within ±0.5 μm | within ±0.5 μm | within ±1 μm | within ±10 μm |
| Ex. 9 | within ±0.5 μm | within ±0.5 μm | within ±1 μm | within ±10 μm |
| Ex. 10 | within ±0.5 μm | within ±0.5 μm | within ±1 μm | within ±10 μm |
| Ex. 11 | within ±0.5 μm | within ±0.5 μm | within ±1 μm | within ±10 μm |
| Ex. 12 | within ±0.5 μm | within ±0.5 μm | within ±1 μm | within ±10 μm |

Ex. = Example

As shown in Table 3, the accumulated pitch accuracy of optical fiber fitting portions of the optical fiber guide blocks obtained in each of Examples 1 to 12 is as high as within ±0.5 μm, and the depth accuracy of the optical fiber fitting portions is also as high as within ±0.5 μm. Further, the range fluctuation in values of width (width of optical fiber fixing part viewed as a front view) among the optical fiber guide blocks produced in the number of 100 in each of these Examples is as small as within ±1 μm, and the range fluctuation in values of thickness (maximum thickness of optical fiber fixing part viewed as a front view) is as small as within ±10 μm.

Further, in each Example, the quantity of optical fiber guide blocks which caused a burr was 7% or less, and no optical fiber guide block had optical fiber fitting portions having a burr caused. Further, no optical fiber guide block underwent chipping when released from the shaping mold.

COMPARATIVE EXAMPLE 1

Optical fiber guide blocks in the total number of 100 were prepared in the same manner as in Example 1 except that the preforms were replaced with preforms having the form of a rectangular prism having a length of 11 mm, a width of 4.5 mm and a thickness of 1.625 mm.

As a result, the subject filling of glass in corners of each optical fiber guide block was not complete similarly to Examples, while overfilling of glass occurred on the side of lower-staged parts and a burr was liable to occur, so that failures such as chipping, etc., frequently took place when the optical fiber guide blocks were released from the shaping molds. Further, the pattern transferability for optical fiber fitting portions, particularly, the pattern transferability for end portions and their vicinities of individual optical fiber fitting portions was poor, and not desired forms were formed but semi-circles appeared.

As explained above, the preform of the present invention enables the production of optical fiber fixing members having desired appearances with high producibility at high yields of non-defective products. Therefore, optical fiber fixing members can be provided at a low cost.

What is claimed is:

1. A preform shapable, by a mold shaping method, into an optical fiber fixing member having an optical fiber fixing part having an upper surface on which at least one optical fiber fitting portion for fixing at least one end portion of at least one optical fiber is formed and a lower-staged part of which the upper surface is formed in a position lower than said at least one optical fiber fitting portion and which is formed adjacent to the optical fiber fixing part, said preform comprising:

a large-thickness portion having an upper surface or a peak portion to which at least one transfer-shaping surface of a shaping mold for mold shaping, which is to shape said at least one optical fiber fitting portion, comes into contact with at an initial stage of mold shaping; and a small-thickness portion having an upper surface or a peak potion to which at least one transfer-shaping surface, of the shaping mold which is to shape the upper surface of the lower-staged part, comes into contact with at an initial stage of the mold shaping; and said preform having a configuration wherein said small-thickness portion is adjacent to said large-thickness portion, and so that the form of said preform viewed in plan parallels the form of said optical fiber fixing member viewed in plan, and so that the form of said preform in side view parallels the form of said optical fiber fixing member in side view.

2. The preform of claim 1, wherein the preform satisfies a ratio t/T of between 1.001 and 2.5, in which t is a maximum thickness of the large-thickness portion of the preform and T is a maximum thickness of the optical fiber fixing part of an intended optical fiber fixing member.

3. The preform of claim 2, wherein the preform satisfies a volume ratio $[(v_1/V_1)-(v_2/V_2)]$ of between 0.001 and 0.1, in which $V_1$ is a volume of the optical fiber fixing part of an optical fiber fixing member to be produced by a mold shaping method, $V_2$ is a volume of the lower-staged part of the optical fiber fixing member, $v_1$ is a volume of the large-thickness portion of a preform and $v_2$ is a volume of the small-thickness portion of the preform.

4. The preform of claim 2, wherein the large-thickness portion, when cut in a direction at right angles with a direction in which the preform is viewed s a front view, has the cross-sectional form of a polygon having sides whose number is equivalent to, or greater than, that of a tetragon, a semi-circle, a vault, any one of forms obtained by rounding corners of these, an ellipse, or a circle.

5. The preform of claim 2, wherein the preform is formed of glass.

6. The preform of claim 2, wherein at least part of contour line of bottom surface(s) of the preform viewed as a bottom view is formed of (i) part of one curved surface or (ii) an edge of two surfaces which intersect with each other at an angle of greater than 90°.

7. The preform of claim 1, wherein the preform satisfies a volume ratio $[(v_1/V_1)-(v_2/V_2)]$ of between 0.001 and 0.1, in which $V_1$ is a volume of the optical fiber fixing part of an optical fiber fixing member to be produced by a mold shaping method, $V_2$ is a volume of the lower-staged part of the optical fiber fixing member, $v_1$ is a volume of the large-thickness portion of a preform and $v_2$ is a volume of the small-thickness portion of the preform.

8. The preform of claim 7, wherein the large-thickness portion, when cut in a direction at right angles with a direction in which the preform is viewed as a front view, has the cross-sectional form of a polygon having sides whose number is equivalent to, or greater than, that of a tetragon, a semi-circle, a vault, any one of forms obtained by rounding corners of these, an ellipse, or a circle.

9. The preform of claim 7, wherein the preform is formed of glass.

10. The preform of claim 7, wherein at least part of contour line of bottom surface(s) of the preform viewed as a bottom view is formed of (i) part of one curved surface or (ii) an edge of two surfaces which intersect with each other at an angle of greater than 90°.

11. The preform of claim 1, wherein the large-thickness portion, when cut in a direction at right angles with a direction in which the preform is viewed as a front view, has the cross-sectional form of a polygon having sides whose number is equivalent to, or greater than, that of a tetragon, a semi-circle, a vault, any one of forms obtained by rounding corners of these, an ellipse, or a circle.

12. The preform of claim 11, wherein the preform is formed of glass.

13. The preform of claim 11, wherein at least part of contour line of bottom surface(s) of the preform viewed as a bottom view is formed of (i) part of one curved surface or (ii) an edge of two surfaces which intersect with each other at an angle of greater than 90°.

14. The preform of claim 1, wherein the preform is formed of glass.

15. The preform of claim 14, wherein at least part of contour line of bottom surface(s) of the preform viewed as a bottom view is formed of (i) part of one curved surface or (ii) an edge of two surfaces which intersect with each other at an angle of greater than 90°.

16. The preform of claim 1, wherein at least part of a contour line of at least one bottom surface of said preform, in bottom view, is formed of (i) part of one curved surface or (ii) an edge of two surfaces which intersect each other at an angle of greater than 90°.

17. The preform of claim 1, wherein the large-thickness portion, when cut in a direction at right angles with a direction in which the preform is viewed as a front view, has the cross-sectional form of a tetragon.

18. The preform of claim 1, wherein the large-thickness portion, when cut in a direction at right angles with a direction in which the preform is viewed as a front view, has the cross-sectional form of a semi-circle.

19. The preform of claim 1, wherein the large-thickness portion, when cut in a direction at right angles with a direction in which the preform is viewed as a front view, has the cross-sectional form of a vault.

20. The preform of claim 1, wherein the large-thickness portion, when cut in a direction at right angles with a direction in which the preform is viewed as a front view, has the cross-sectional form of a tetragon with rounded corners.

21. The preform of claim 1, wherein the large-thickness portion, when cut in a direction at right angles with a direction in which the preform is viewed as a front view, has the cross-sectional form of a vault with rounded corners.

22. The preform of claim 1, wherein the large-thickness portion, when cut in a direction at right angles with a direction in which the preform is viewed as a front view, has the cross-sectional form of a ellipse.

23. The preform of claim 1, wherein the large-thickness portion, when cut in a direction at right angles with a direction in which the preform is viewed as a front view, has the cross-sectional form of a circle.

* * * * *